(12) United States Patent
Klavins

(10) Patent No.: US 10,242,369 B2
(45) Date of Patent: Mar. 26, 2019

(54) METHOD AND ASSOCIATED SYSTEM OF PROVIDING AGRICULTURAL PEDIGREE FOR AGRICULTURAL PRODUCTS WITH INTEGRATED FARM EQUIPMENT THROUGHOUT PRODUCTION AND DISTRIBUTION AND USE OF THE SAME FOR SUSTAINABLE AGRICULTURE

(71) Applicant: Bayer CropScience LP, Research Triangle Park, NC (US)

(72) Inventor: Maris Klavins, Raleigh, NC (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/573,358

(22) Filed: Dec. 17, 2014

(65) Prior Publication Data

US 2015/0100358 A1  Apr. 9, 2015

Related U.S. Application Data

(62) Division of application No. 13/500,237, filed as application No. PCT/US2011/054689 on Oct. 4, 2011, now abandoned.

(Continued)

(51) Int. Cl.
*G06Q 30/00* (2012.01)
*G06Q 10/06* (2012.01)
(Continued)

(52) U.S. Cl.
CPC .......... *G06Q 30/018* (2013.01); *A01M 17/00* (2013.01); *G06Q 10/063* (2013.01); *G06Q 10/0631* (2013.01); *G06Q 50/02* (2013.01)

(58) Field of Classification Search
CPC ......... G06Q 10/00; G06Q 40/06; G06Q 17/60
(Continued)

(56) References Cited

U.S. PATENT DOCUMENTS

| 4,992,942 A | * | 2/1991 | Bauerle | .................. | A01G 31/00 |
| | | | | | 700/284 |
| 5,566,069 A | * | 10/1996 | Clark, Jr. | ................ | G06F 3/033 |
| | | | | | 702/2 |

(Continued)

OTHER PUBLICATIONS

Metternicht, Graciela, Use of remote sensing and GNSS in precision agriculture UN-Zambia-ESA Regional Workshop on the Applications of GNSS in Sub-Saharan Africa, Jun. 2006.*

(Continued)

*Primary Examiner* — Romain Jeanty
(74) *Attorney, Agent, or Firm* — Morrison & Foerster LLP

(57) ABSTRACT

A method and associated system for establishing an agricultural pedigree for at least one agricultural product with integrated farm equipment comprises the steps of: a) Providing an open communication network accessible information storage device adapted to receive input of data relating to at least one of the agricultural product's production, harvesting, distribution, processing and consumption, from at least one and preferably from multiple sources; b) Inputting one or more contemporaneous inputs into the information storage device over time throughout at least the production of the agricultural product, wherein the inputting includes automated contemporaneous uploading of inputs from farm equipment engaged in the production of the agricultural product; c) Storing and said data; and d) Providing access to at least a portion of said data via the open communication network. The method may further include predicting at least one sustainability measurement of the agricultural product utilizing said data.

20 Claims, 2 Drawing Sheets

Related U.S. Application Data

(60) Provisional application No. 61/389,851, filed on Oct. 5, 2010.

(51) Int. Cl.
*G06Q 50/02* (2012.01)
*A01M 17/00* (2006.01)

(58) Field of Classification Search
USPC .................................................. 705/7.12
See application file for complete search history.

(56) References Cited

U.S. PATENT DOCUMENTS

| | | | | |
|---|---|---|---|---|
| 5,699,244 A * | 12/1997 | Clark, Jr. | ................. | G06F 3/033 701/469 |
| 5,771,169 A * | 6/1998 | Wendte | ................ | A01B 79/005 702/5 |
| 5,884,224 A * | 3/1999 | McNabb | ................. | A01G 7/00 700/284 |
| 5,897,619 A * | 4/1999 | Hargrove, Jr. | ......... | A01B 79/00 705/317 |
| 6,141,614 A * | 10/2000 | Janzen | ................ | A01B 79/005 172/2 |
| 6,294,997 B1 * | 9/2001 | Paratore | ............. | G06K 19/0723 235/385 |
| 6,505,146 B1 * | 1/2003 | Blackmer | ........... | A01B 79/005 340/991 |
| 6,820,009 B2 * | 11/2004 | Sommer | ................ | G06Q 10/08 702/2 |
| 6,885,968 B2 * | 4/2005 | Breed | .................... | B60Q 9/008 702/142 |
| 7,062,513 B2 * | 6/2006 | Beck | .................... | A01B 79/005 |
| 7,167,797 B2 * | 1/2007 | Faivre | ................... | A01D 91/00 56/1 |
| 7,440,901 B1 * | 10/2008 | Dlott | ................ | G06Q 10/06393 235/375 |
| 7,761,334 B2 * | 7/2010 | Pickett | ................... | G06Q 10/06 702/2 |
| 7,991,754 B2 * | 8/2011 | Maizel | ................... | G06Q 10/00 707/705 |
| 8,150,554 B2 * | 4/2012 | Anderson | .............. | G06Q 50/06 47/1.5 |
| 8,489,437 B1 * | 7/2013 | Dlott | ..................... | G06Q 30/02 705/1.1 |
| 8,521,372 B2 * | 8/2013 | Hunt | ..................... | G06Q 10/00 701/50 |
| 8,924,030 B2 * | 12/2014 | Wendte | ................ | A01B 79/005 700/283 |
| 2002/0103688 A1 * | 8/2002 | Schneider | ............. | A01B 79/00 705/7.28 |
| 2002/0133505 A1 * | 9/2002 | Kuji | ........................ | G06Q 30/02 |
| 2003/0182260 A1 * | 9/2003 | Pickett | ................. | A01B 79/005 |
| 2003/0236768 A1 * | 12/2003 | Sribhibhadh | .......... | G06Q 10/06 |
| 2006/0250578 A1 * | 11/2006 | Pohl | ..................... | G06F 3/0238 351/210 |
| 2009/0005990 A1 * | 1/2009 | Anderson | .............. | G06Q 10/00 702/2 |
| 2009/0164264 A1 * | 6/2009 | Zolezzi | .................. | G06Q 30/02 705/7.38 |
| 2010/0131343 A1 * | 5/2010 | Hamilton, II | ...... | G06Q 30/0222 705/14.23 |
| 2011/0290873 A1 * | 12/2011 | Nishiguchi | .......... | A01B 79/005 235/376 |

OTHER PUBLICATIONS

Day W. et al., An engineering approach to modeling, decision support and control for sustainable systems Philosophical Transactions of the Royal Society, vol. 363, 2008.*

Peter "Changing Patterns of Trade in Processed Agricultural Products" OECD Food, Agriculture and Fisheries, Papers No. 47, Pages (Year: 2011).*

* cited by examiner

METHOD AND ASSOCIATED SYSTEM OF PROVIDING AGRICULTURAL PEDIGREE FOR AGRICULTURAL PRODUCTS WITH INTEGRATED FARM EQUIPMENT THROUGHOUT PRODUCTION AND DISTRIBUTION AND USE OF THE SAME FOR SUSTAINABLE AGRICULTURE

The present application is a divisional application of U.S. patent application Ser. No. 13/500,237 filed Jun. 12, 2012 and which published as publication number 2013-0185104, which publication is incorporated herein by reference in its entirety. U.S. patent application Ser. No. 13/500,237 is the national stage application of International application PCT/US11/54689 filed Oct. 4, 2011 and which published as publication number WO 2012/047834, which publication is incorporated herein by reference in its entirety. International application PCT/US11/54689 claims priority of U.S. Provisional Patent Application Ser. No. 61/389,851 entitled "A System and Method of Coordinating Information Relating to Food Production and Distribution" filed Oct. 5, 2010.

BACKGROUND OF THE INVENTION

1. Field of the Invention

The present invention relates in general to the field of agriculture, and more particularly to a system and method for coordinating information relating to the production and tracking of agricultural products and any by-products thereof for providing an agricultural pedigree. The present invention is also directed to utilizing such information for, among other purposes, communication, real time decision making, predictive modeling, risk sharing and/or sustainable agriculture purposes.

2. Background Information

The Merriam-Webster online dictionary defines "symphonic" in one of its definitions as "suggestive of a symphony especially in form, interweaving of themes or harmonious arrangement." Usually, a symphony is comprised of several sections of instruments, each with its own characteristics and attributes. During a typical warm up session, each member of each section often plays their own individual warm up routines, and resulting cacophony is most discordant and unpleasant. But with a tap of a baton, the orchestra conductor coordinates the individuals and the sections, to produce quite the opposite result. In many ways, current global food/agricultural products production is in a state similar to that of a symphony in its warm up session, awaiting and in need of the presence of the orchestra conductor. The present invention is directed to addressing that need.

In some instances below, the following discussion will focus on the production of specific agricultural crops for simplicity. It is to be understood that this is simply a mechanism to facilitate description of the present invention in a manner that is easy to understand. The present invention is not so limited as is pointed out below. Similarly, while the discussion below may focus on the production of agricultural products from seeds, the invention is equally not so limited and includes all forms of agricultural product production, whether from seed or other starting material, and is not limited to plant-based agricultural products, but includes for example, meat, poultry, fish, but the invention certainly is not so limited. For the avoidance of doubt, the term agricultural product as used herein includes all of these and any other agricultural products used for any purpose, including but not limited to food, clothing, medicine or any other purpose.

In the current state of global food/agricultural product production, there are conceptually speaking, at least two items being harvested from any field where such crops are grown. First, of course, are the crops themselves. Secondly, and equally importantly in the current world, is the need to harvest information relating to the crop itself. The information associated with the agricultural product that may be collected is substantial indeed. For example, with regard to seed based agricultural products, it includes but is not limited to, information relating to the location of planting, the timing of planting, the variety being planted. Where, when and how the seeds were produced, transported and stored? Was it genetically modified? Were the seeds treated or coated in any way? If so, with what and when? How and when were the seeds planted? What kind of soil? How deep? How much water was applied? Were any insecticides, fungicides, herbicides, fertilizers and/or any other active or inactive ingredients used before, during or soon after planting? If so, what and when and how much of such materials were applied? If any such materials were used, were they applied in furrow, foliarly, post emergence, pre-emergence or combinations thereof? Was such material applied as drench, drip or spray? What this in a greenhouse, a field or other location? If a field, was the field fenced off or otherwise protected in any manner for any purpose, such as but not limited to pest control for example by preventing infestation by deer, mice, insects, fungi, etc. What were the weather conditions during the growth cycle? How much rain? When? What daytime temperatures? What night time temperatures? Were any materials applied post-harvest, such as in storage facilities or to coat/treat the harvested food product for long term storage, appealing looks or other reasons?

After harvest, a similar set of information applies to the entirety of the collection and distribution steps. For example: who transported the crop? When was it picked up at the farm? What path did it take in its distribution to the final consumer? How was it packaged? In what type of vehicle or other transportation device was it transported? Was it stored anywhere in its distribution? Was it treated in any manner during its harvesting, packaging, and/or distribution? If stored, where? How long? Under what conditions? When was it shipped? When did it arrive? When it left the farm, did it go directly to a consumer or a food processor or an international shipper or other destination? Was it inspected or graded by any governmental or other agencies during its production and distribution, and if so, what agencies, when and what were the results?

The foregoing is illustrative only, and the nature, form and amount of information that is relevant to the planting, harvest, sale, transportation and final disposition of the crop varies greatly and is often quite large and is growing in size and complexity, in part because expanding technology is capturing more and more information in our world, leading to the result that the information is becoming of great value, in some cases, as valuable as the crop itself. In short, the information starting with the agricultural product's entire pedigree in terms of its history of development and preparation for planting, through the entire growth cycle, through harvest, distribution, processing where applicable, and end user consumption are replete with volumes of useful and necessary information/data.

The reasons for and/or entities desiring access to such data collection are equally numerous and vary with a wide variety of interested participants. Outbreaks of diseases, which can be dangerous or even fatal in nature, such as E coli etc, can set up the need to be able to trace the production of an agricultural product to find the source of infection. Indeed, attempts have been made to pass food safety legislation directed to such matters. And regulatory bodies such as the US EPA, and/or food protection agencies such as the US FDA and/or USDA may demand such information. Consumers with certain preferences/ideologies, whether secular or religious for example, relating to the manner in which food is produced may want to know the agricultural product's history/pedigree to confirm that it comports with their beliefs/desires/traditions.

Consumer's with preferences/ideologies completely unrelated to the food itself may have an interest in knowing its pedigree, as for example, consumers or others interested in preserving energy may want to know how much energy was expended in producing the agricultural product and/or was it done in a "sustainable" fashion, was it grown with a minimal carbon footprint, minimal water usage or other factors related to sustainability. Sustainability here may include or as a separate matter, the efficiency of conversion of the agricultural product to produce energy (e.g. use as a biodiesel or ethanol based product) or even the efficiency of converting the agricultural product into human energy, e.g. calories, may be considered.

Other entities, such as large retail distributors, are also often equally as interested in such information, with a desire to promote sales of their goods by purchasing them from growers expending the least energy and maintaining a "sustainable" method to produce the agricultural product. Exporters and governmental units overseeing the exportation and/or importation in the US and other countries also desire to know such information to determine if the agricultural product meets, for example, sanitary, phyto-sanitary and MRL standards for a company importing such agricultural products. MRL stands for "maximum residue level" and means the highest residue level permitted, (and usually determined by a governmental agency appointed to regulate such matters in a given country or state), of an active ingredient on a treated commodity or crop. Failure to meet the MRL standard set by the importing country will mean the agricultural product will be refused entry into that market, and in such cases, there may not be enough time to divert the agricultural product to an accepting country before the agricultural product is lost, depending upon the timing and nature of the agricultural product. Also included is information relation to the agricultural product's shelf life or other storage or "use by" dates, directions, recommendations or procedures. Still further is included information relating to cooking, preparing, blending and/or otherwise processing the agricultural product if processing of it is involved.

These are only some of the types of information being generated from the field/farm/fishery/range or other location where the agricultural product is being produced and are only some of those who are interested in such information spanning production and distribution of the agricultural product, such as, in the case of a seed based agricultural product for example, from the time of seed creation through consumption by the end user/consumer. A detailed list of either the information and/or those who would make use of such information would be virtually limitless.

Efforts have been made to track discreet packets of such information. For example, today's modern tractor is a technological wonder, having the ability to guide itself with GPS and provide its crop and/or crop inputs and chemicals almost without, and in some cases, fully without, the need for an operator on board. Equally impressive are the systems aboard such tractors to track when and where the tractor was used, and what it was planting, harvesting, spraying or otherwise doing when it was utilized in the course of the production of the agricultural product. Further, systems are known that are associated with such tractors and/or farm equipment to collect that information and provide it to a recipient, such as a grower, often involving computers and communication devices to transmit and receive such data. Satellite technology too grows rapidly each day in its sophistication and capability and can or will soon measure parameters such as insect stress, fungal stress, drought stress, soil moisture, soil pH, mineral content, nitrogen content (e.g. to provide a plan for variable rate fertilization for example), growth rates, yields, actual and projected, among others. And detecting any such parameters, satellites can turn on or off equipment, such as irrigation systems, in response to what the satellite has observed. Indeed, such a satellite can convey its information directly to its technological partner, the tractor, and can instruct the tractor what to apply when and where to the field and/or when to harvest or otherwise act upon the agricultural product for optimum results. And with global positioning technology and timing devices, the tractor will know where, where and how to conduct such treatment, and can even do so fully automatically without human intervention. Control of a field, for a field based agricultural product, at levels, or even microlevels heretofore unknown are possible with modern satellite technology. Precision agricultural practices, non stop over, 24 hours a day, 7 days a week, 365 days a year are possible with such technology.

Similarly, for the production, harvest, storage, transportation and/or processing stages to the end user/consumer, there are methods at each step in the process of producing the agricultural product that collect certain portions/packets of information. But just as a symphony in warm up session, these separated, uncoordinated independent sources of data operate without harmony, and there remains a long and deep-felt need in the industry for a method and/or system that can "tap the baton" to coordinate this data in a fashion that is usable all along the chain from its early stages of production of the agricultural product, as for example with a seed-based agricultural product, from seed production, through planting and growth, through harvest, storage, distribution, processing where applicable and final consumption. It is also desired that such a system/method be easily accessible and easily used by some or all of those who have need of its information.

The present invention is directed to fulfilling these and other needs, and is described below. It is an object of the present invention to address the deficiencies of the prior art discussed above and to provide a system and method of providing agricultural pedigree for agricultural products throughout production and distribution and use of the same for, among other purposes, communication, real time decision making, predictive modeling, risk sharing and/or sustainable agriculture purposes.

SUMMARY OF THE INVENTION

The various embodiments and examples of the present invention as presented herein are understood to be illustrative of the present invention and not restrictive thereof and are non-limiting with respect to the scope of the invention.

Within the meaning of this specification Agriculture is the cultivation of plants and animals for food, fiber and other useful products; and Traceability with regard to agricultural products is the ability to track agricultural products throughout the entirety of the production and distribution chain. One description of traceability of agricultural products is the ability to track the products from starting materials to end uses, as for example with seed-based agricultural products, from the creation of the seeds, through their planting, growing, harvesting of the crop, through its distribution directly or indirectly (e.g. through food processors, shippers and the like), to the end customers/consumers. The Merriam Webster Free On-line Dictionary defines "pedigree" as the origin and history of something. Additionally, within the meaning of this specification Agricultural Pedigree refers to the origin and history of an agricultural product, from its earliest of stages of creation of its starting materials (e.g. for seed-based agricultural products it would be the creation of the seeds, for example) through its production, harvest, distribution and final consumption, and may be considered a record of some or all of the inputs, treatments and processes performed on or to a given agricultural product in its production and distribution, some or all of which may be selected and/or defined by one or more entities making use in one or more ways of such Agricultural Pedigree.

Within the meaning of this specification, Sustainable Agriculture may be defined as "an integrated system of plant and animal production practices that will last over the long term and will: satisfy human food and fiber needs; make the most efficient use of non-renewable and on-farm resources and integrate, where appropriate, natural biological cycles and controls; sustain the economic viability of farm operations; and enhance the quality of life for farmers and society as a whole." Alternatively Sustainable Agriculture can be broadly described as the practice of farming using principles of ecology, the study of relationships between organisms and their environment. Sustainable Agriculture in the United States was addressed by the 1990 farm bill. More recently, as consumer and retail demand for sustainable products has risen, organizations such as Food Alliance and Protected Harvest have started to provide measurement standards and certification programs for what constitutes a sustainably grown crop.

Within the meaning of this specification an open communication network represents a network that can be accessed by additional devices coming into or onto the network, such as the internet. Alternatively a wide area network or (WAN) could form an open communication network within the meaning of this application, wherein a WAN is a telecommunication network that covers a broad area (e.g., any network that links across metropolitan, regional, or national boundaries). For example, business and government entities often utilize WANs to relay data among employees, clients, buyers, and suppliers from various geographical locations. Additionally a collection of interconnected Local Area Networks (LANs) could form an open communication network within the meaning of this application where one or more of the LANs can be accessed by additional devices coming into or onto the interconnected networks. With the rapid rate of advancement of science and technology in this area it is very difficult to predict all of the permutations of an open communications network that may come into being during the term of this patent, but nonetheless such devices are within the scope of this invention if they are capable of performing the functions described herein with regard to the open communication network of the present invention.

Within the meaning of this specification decision support system or DSS is a computer-based information system that supports individual, organizational, or other decision making activities. DSSs often serve the management, operations, and planning levels of an organization and help to make decisions, which may be rapidly changing and not easily specified in advance. DSSs include knowledge-based systems. In one embodiment, a properly designed DSS is an interactive software-based system intended to help decision makers compile useful information from a combination of raw data, documents, personal knowledge, or business models to identify and solve problems and make decisions. Within this application a real time decision making tool is a communication and data-driven DSS or data-oriented DSS which emphasizes access to and manipulation of a time series or history of data to the date of the decision. Within this application a predictive modeling tool is a model-driven DSS which utilizes and emphasizes access to and manipulation of a statistical, financial, optimization, or other simulation model to enable decision makers to evaluate alternative decision making scenarios and to predict, and, optionally, compare, rank or otherwise examine and consider and/or manipulate such scenarios.

Within the meaning of this specification, in its broadest sense an information storage device references a device capable of storing information and/or data, without limitation to its particular design components and regardless of how or on what media the information is stored. It is preferred that the information storage device is capable of retrieval and other manipulation of the information it is storing. With the rapid rate of advancement of science and technology in this area it is very difficult to predict all of the permutations of information storage devices that may come into being during the term of this patent, but nonetheless such devices are within the scope of this invention if they are capable of performing the functions described herein with regard to the information storage device of the present invention. Presently, in one embodiment, the information storage device can be an electronic data storage device to store and retrieve that data, such as a computer data storage device. Data may be stored in either an analog or digital format on a variety of media, and the particular media is not limiting to the present invention.

According to one non-limiting embodiment of the present invention, a method for establishing an agricultural pedigree for at least one agricultural product with integrated farm equipment comprises the steps of: a) Providing an open communication network accessible information storage device adapted to receive input of data relating to at least one of the agricultural product's production, harvesting, distribution, processing and consumption, from at least one and preferably from multiple sources; b) Inputting one or more contemporaneous inputs into the information storage device over time throughout at least the production of the agricultural product, wherein the inputting includes automated contemporaneous uploading of inputs from farm equipment engaged in the production of the agricultural product; c) Storing and said data; and d) Providing access to at least a portion of said data via the open communication network.

According to one non-limiting embodiment of the present invention, a method for establishing an agricultural pedigree and sustainability measurement for at least one agricultural product with integrated farm equipment comprises the steps of: a) Providing an open communication network accessible information storage device adapted to receive input of data relating to at least one of the agricultural product's production, harvesting, distribution, processing and consumption, from at least one and preferably from multiple sources; b) Inputting one or more contemporaneous inputs into the information storage device over time throughout at least the production of the agricultural product, wherein the inputting includes automated contemporaneous uploading of inputs from farm equipment engaged in the production of the agricultural product; c) Storing and said data; d) Predicting at least one sustainability measurement of the agricultural product utilizing said data; and d) Providing access to at least a portion of said data via the open communication network.

According to one non-limiting embodiment of the present invention, an agricultural pedigree system for at least one agricultural product comprises an open communication network accessible information storage device adapted to receive input of data relating to at least one of the agricultural product's production, harvesting, distribution, processing and consumption from at least one and preferably from multiple sources and configured for one or more contemporaneous inputs into the information storage device over time throughout at least one of the production, harvesting, distribution, processing and consumption of the agricultural product.

These and other advantages of the present invention will be clarified in the description of the preferred embodiments taken together with the attached figures.

DESCRIPTION OF THE PREFERRED EMBODIMENTS

The present invention will be described in some instances connection with agricultural products in the form of cultivating crops on a typical farm and seeing them through to final consumption by an end user/consumer, and in particular, in some instances, the production of corn on a typical farm and its distribution to a final end user/consumer will be focused upon in order to provide a working example of the present invention. However, is reiterated and it is to be clearly understood that the present invention is not so limited, and the present invention applies to all forms of agricultural product production, whether the agricultural product is animal (e.g. livestock, fish, poultry, dairy etc), or plant, (e.g. corn, rice, soy, etc), and whether it is produced for a food or a non-food use such as but not limited to clothing, medicine or any other use. Thus, included within, but not limiting to the scope of the present invention are the production of agricultural crops which are food based (e.g., meats, fish, fowl, poultry, and/or dairy production and/or any consumable products produced either as a by-product (leather) or direct product, for example eggs, of any "farm" operations, and non-food based agricultural products (e.g. cotton for textiles or corn grown for making ethanol).

Still further, included within the scope of the present invention are farming or growing operations directed to producing ornamental shrubs, flowers and other plants, including but not limited to pine tree or other similar applications. In short, the present invention applies wherever an agricultural product is produced, and there is a need for some or all of the information relating to its agricultural pedigree.

Figure 1:
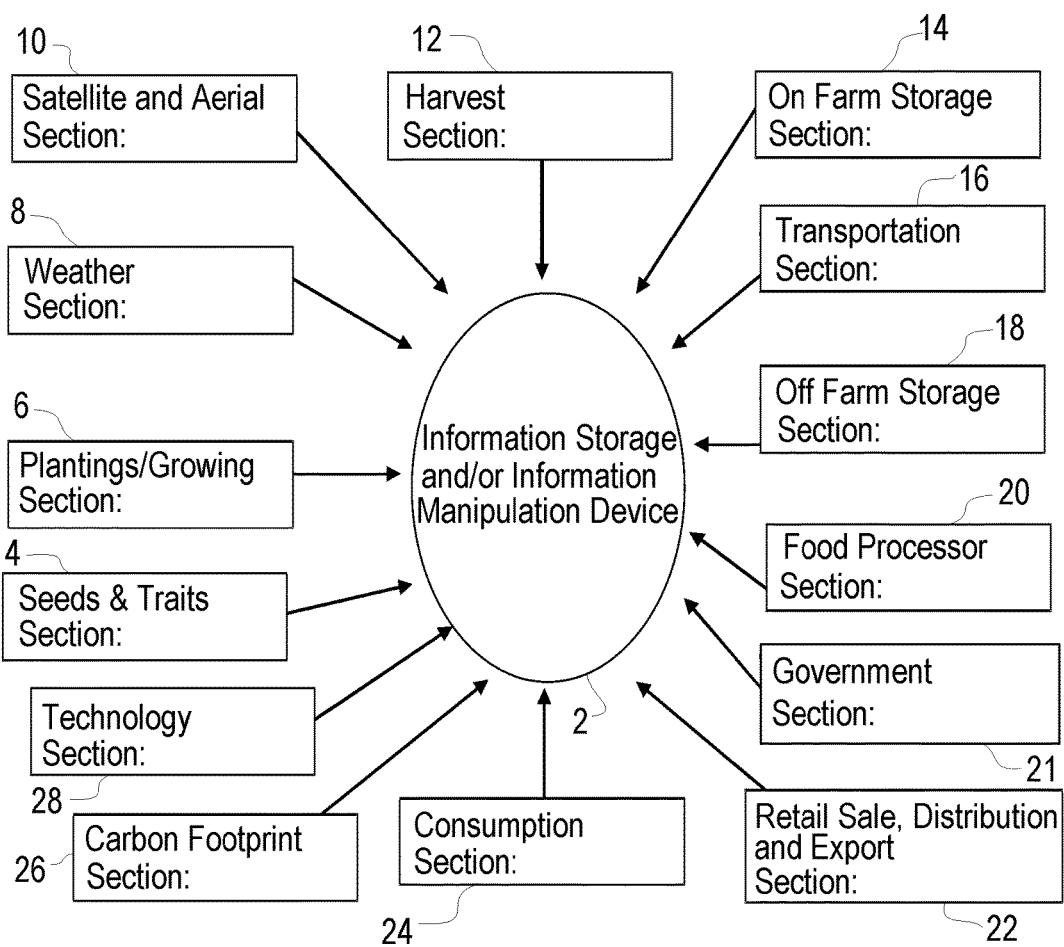
FIG. 1 is schematic representation of selected "input" sources of data relating to agricultural product production and/or distribution for input into the information storage device of the present invention.

Referring now to FIG. 1, there is shown a schematic representation of one embodiment of the system of the present invention. In the center is shown information storage device 2, which takes a central role in the present invention, and may be part of a computer. Information, primarily in the form of data, coming from numerous sources, is collected and at the very least, stored in device 2. The data may be inputted into device 2 manually or automatically as discussed in more detail below.

Preferably, when the device 2 is fully or partially populated with data, the data therein may be manipulated via the computer of the device 2. "Manipulated" means that the data may be organized for display to coordinate various pieces of the data, or it can be more fundamentally manipulated, as for example, to be used in predictive and/or probability modeling to anticipate future events. As discussed below the device 2 may include a manipulation of the obtained data to use in a predictive modeling program to form a predictive modeling tool, which as noted above is a model-driven DSS. Predictive modeling has been envisaged as "organized thinking about the possible". For this purpose, dynamic predictive models of the state-variable approach are important tools which combine basic knowledge on the physical, chemical and physiological processes that underlie crop growth and agricultural production. One dynamic predictive model type is a "comprehensive model" that is designed to integrate all aspects of growth and to focus attention on the main gaps in present operational knowledge of the crop or agricultural product production. Another example of predictive models are known as "summarizing models" that are especially geared to answer 'what-if' questions and are used for evaluating regional or area production potentials and constraints, for irrigation management and integrated control of pests, diseases and weeds. Examples of some of these types of models may be known in the art. The present invention may include the design of new models or may implement these models and, in either case, operates to populate the various parameters with relevant data. Further, the present invention is believed to allow for far more extensive and accurate models to be developed, or refined, in light of the increase in the available information, and its "symphonic" orchestration that is available with the implementation of the present invention. It should be clear that predictive modeling generally also will include the "optimal use" of inputs. Many inputs are known and given such as, often, fuel costs, energy, fertilizer, labor, commodity prices, etc. However, many are variable such as land, seeds and traits, varieties, chemicals, etc. The predictive modeling often addresses the question of: What is the right mix, of inputs, for a selected desired outcome? For example, predictive models address issues such as if an operator rents more land does he or she need more equipment, labor, etc.; or what commodity should an operator grow to maximize profit (given that a known collection or predictive range of all the inputs and costs associated with growing that commodity); or what will this proposed change do to an operator's carbon footprint and carbon credits (e.g., part of the profit may be in selling carbon credits). As may be appreciated, the increase in available information with the present invention, and its aggregation and "symphonic" orchestration allows for predictive modeling of a heretofore unknown range and/or accuracy.

Returning to the overview of the invention, the data inputted into the device 2 may include largely historic information relating to what crop was harvested and in what amount, in what region of the country/globe, and such data might include the costs to produce the crop including labor/fuel/energy/any and all existing leases/fertilizer/seed/chemical and other data related to the crop's production.

In terms of manipulation, this data may be linked with a real time decision making tool in the computer of the device 2, which as noted above is a communication and data-driven DSS or data-oriented DSS which emphasizes access to and manipulation of a time series or history of data to the date of the decision. For example weather data, general crop production data, current fuel pricing data, commodity pricing data for resources and for that crop, or any other relevant data to estimate how much that particular portion of harvested crop might be expected to generate yield and in gross sales for the grower, and with further manipulation to deduct from that figure the costs to the grower to produce, store any crop for future use and transport that crop from the farm for further distribution, thereby providing the grower with a reliable calculation as to how much profit this particularly harvested crop generated for the grower. It could also estimate how much crop should be stored for future sale and/or use. The real time decision making tool can be used for calculating and notifying the user regarding time sensitive matters, such as when irrigation, fertilizing, pest control, harvesting or the like is required at select crop portions.

It is an important aspect of the present invention that manipulation of the data may be done with both the real time decision making tool that is essentially calculating results based upon inputs to date, and the predictive modeling tool providing predictive results based upon simulation models. For example, predictive information such as predicted weather patterns and/or regional, national or global estimated crop production figures for the following year and which varieties of crops demonstrated the greatest yields in a given growing region, will allow the grower to assess, for example, how much of his or her farm should be devoted to which crops, and even which varieties, to maximize profits for the following year. Such predictive modeling may also take into consideration, aerial, satellite or other imaging, which imaging often contains additional data such as properties of the soil, quantity of crop being grown, and the levels in those crops of chlorophyll, various minerals, moisture, acidity, and other indicators of quality or quantity. When combined with the former data, can be used to actually predict for the grower not only which crops will maximize profits, but actually where on the farm they should be planted in connection with such imaging technology. The output can be coupled with graphic software and/or other means, for example, to provide the grower with detecting specific diseases in annual and/or perennial crops facilitating the creation of decision planning maps for his or her farm. Still further, the results of such predictive modeling simulations can be fed into the computers and/or storage device of modern farm equipment, so that much if not all of the information necessary to implement the mapped plan can be already input into the said equipments computer and/or storage device.

It is important to observe, that such predictive modeling will preferably allow the grower to self-manipulate several variables relating to the above information. In this way, a given grower can ask himself or herself, "what if" questions such as the following. What if I change crops next year to another crop—what profit might I expect with the new crop? What if I leased another 500 acres at "x" dollars, how much profit will I have once I pay my leaser? What additional or different equipment might I have to buy, lease or rent to be as efficient as possible with such new crop. What if my fertilizer cost increases by 5% next year? And device 2, populated with the requisite data and predictive modeling tool, will run the associated simulation and provide predictive answers to such questions.

It is also important to note that the present invention provides benefits beyond those relating to production, profitability, and predictive modeling of "what if" scenarios. Both for an existing growing season or for a growing season to come, such predictive modeling can assist the grower in other ways. Notably for example, currently a grower seeks financing which is often provided based upon past performance by the grower, often performance over the last 3 years where available. While that is likely to remain an important method of analysis, the predictive modeling of the present invention provides a very useful tool to predict yields and profitability of existing crops and potential future crops (excluding of course any unforeseen catastrophic events), and armed with this predictive modeling, the grower may well secure financing or credit from lenders (for any purposes, including farm production or personal expenses and the like) such as banks or even seed or chemical production companies or even farm equipment manufacturing companies. The system becomes a risk reducing tool for the lender as it is a verifiable assessment of the proposed agricultural plan upon which recourses are to be lent. While predictive modeling does not result in a certainty of future performance, it does provide arguably a more reliable methodology than had been used in the past in connection with lending/credit. The mortgage banking crisis experienced of the last few years where credit decisions were made apparently, with little or no supporting data or analysis, highlights the need for a verifiable assessment of a proposed agricultural plan. So the use of this predictive modeling in connection with financing is not a completely abstract idea.

In short then, as may be appreciated, the manipulation of the data can be profound, even at the grower level.

As may be seen in FIG. 1, the current production of crops is often no longer a one or two person matter of purchasing seeds, planting them, growing them and harvesting the crop. What may have once long ago been largely a solo act or a combo of a few players in the realm of food production has grown to a full ensemble comprised of many individual players with greatly differing roles that are grouped into sections, which sections have joined to form the orchestra of today's food production system. The system of the present invention is designed to seamlessly integrate data from these disparate sources resulting in a system and method of providing agricultural pedigree for agricultural products throughout production and distribution and provide for the use of the same for sustainable agriculture and provide the use of the same for communication, real time decision making, predictive modeling and risk sharing.

For example, referring again to FIG. 1, there will be seen a schematic representation of selected "sections" (to borrow that musical terminology in connection with describing the present invention) in today's food production "orchestra", (to again borrow that musical terminology in connection with describing the present invention). FIG. 1 describes the present invention in the context of a seeds-based crop agricultural product for ease of description, but as pointed out above the present invention is not so limited and applies to all agricultural products as discussed fully above. By way of example then, illustrated in FIG. 1 is seeds and traits section 4, plantings/growing section 6, weather section 8, satellite and aerial section 10, harvest section 12, on farm storage section 14, transportation section 16, off farm storage section 18, food processor section 20, government section 21, retail sale, distribution and export section 22, consumption section 24, carbon footprint section 26 and technology section 28. The sections illustrated in FIG. 1 are somewhat arbitrarily identified, and other sections may certainly be added or the illustrated sections may be divided and/or subdivided and/or defined in differing ways and all remain within the scope of the intent of the present invention. The important point is that today's food production is a complicated and complex operation, involving numerous different participants and all must work together for the system to operate, and each generates and consumes different information from others involved in that process.

The data/information associated with the seeds and traits section 4 may be quite substantial in and of itself. For example, if the crop is corn, it is no longer sufficient to simply note the variety being planted. Varieties may include genetic modification (which may be comprised of singular or stacked genetic events) and if so, this fact and what modifications are data to be collected. Such genetic modification may include but is not limited modifications that allow the corn to have resistance to certain herbicides, to have certain insect resistance, to withstand certain growing conditions such as heat or drought or any combinations thereof. Still further, the seeds themselves may be treated with any number of coatings, which may include active compounds such as fungicides, herbicides, insecticides, biological/bacterial agents, living beneficial agents and the like, or inactive compounds such as talc or polymeric coatings that can perform a number of functions, such as improving the plantability of the seeds. All of this represents data to be inputted into device 2. The data from the seeds and traits section 4 is typically held by different individual entities. For example, it is often the case that the breeders developing the traits provide their seeds to a different entity for coating, and the data relating to materials that are being coated onto the seeds, e.g. insecticides, fungicides, biological/bacterial agents, living beneficial agents and the like, may be held by the chemical company/ies that produced compounds. Thus, separate individual entities, much like individual musicians within a given section of an orchestra, hold different information in the seeds and traits section 4, and the data from these individual players can be input into device 2. As the present invention has been illustrated in association with the farmer or grower, the farmer's use of the device 2 will be to obtain this information preferably from the seed breeders and distributors with the purchase of the seeds. It is anticipated that the seed breeders will have their own communication to device 2 and their associated data may be transferred automatically via an internet or other connection over the open communication network. The data can be inputted manually or transferred via another storage device such as a USB port memory stick or other information storage device. All of the relevant data associated with the seeds sufficient to maintain an accurate agricultural pedigree for the crops is transferred to the device 2. In alternative embodiment of the present invention, the farmer or grower might have his or her own device 2 for capturing information relevant to that farmer or grower's portion of the production of the agricultural product, and the seed breeder may similarly have his or her own device 2 for capturing information relevant to the seed breeder's portion of the production of the agricultural product, and the two respective devices 2's could be in communication with each other over the open communication network. In this embodiment then, the device 2 may then be a collection of several devices 2 aggregated from several individual players or groups of players or sections, all in communication with one another over the open communication network. One advantage though of the single device 2 embodiment is that all information is stored within the single device, and changes/modification/additions etc are, arguably, somewhat simplified by virtue of the single device 2 in one location. In yet another embodiment of the present invention there is a combination of one or more discreet device 2's and a major hub device 2, representing a hybrid of the two previously described embodiments. In practice the device 2, or selected features of the device, may be offered to customers formed by the individual players under Software as a Service (SaaS) model over the open network, sometimes referred to as "on-demand software." The SaaS model is a software delivery model in which software and its associated data are hosted centrally (often in the (Internet) cloud) and are typically accessed by users (farmers, distributors, seed breeders, etc) using a "thin client", normally using a web browser over the Internet.

The SaaS model supports application customization by the industry players. In other words an industry player can alter the set of configuration options (a.k.a., parameters) that affect the end functionality and look-and-feel. Each customer may have its own settings (or: parameter values) for the configuration options. The application can be customized to the degree it was designed for based on a set of predefined configuration options. Further the SaaS model allows for easier, generally more frequent system updates.

Continuing further with FIG. 1, there is shown plantings/growing section 6. Where for example the crop is corn, when the corn was planted, where it was planted and how it was treated during its growth with fungicides, insecticides, herbicides, biological/bacterial agents, living beneficial agents and the like all form data that is necessary to link to the harvesting of that crop. It is here that today's modern farm equipment can form an important mechanism for capturing such information and automatically downloading the relevant data to the device 2. Though, of course, such information can be entered into the device 2 manually to the extent it is available that way. However, with the modern farm equipment linked via computer to the Internet and/or with satellites or other forms of communication, including for example, onboard global positioning technology and the like, such farm equipment are capable of automatically collecting enormous amounts of data relating to the planting and growing of the corn crop. This data includes for example, but certainly is not limited to, data relating to the date/time of planting, of which crop, where in the field, whether any active ingredients or other materials were including during planting, the density of planting, the depth of planting. Following on, as the corn crop is grown, each time the tractor is involved, for example with irrigation or spraying the field with various materials, such data can be collected by the tractor and/or any associated farm equipment and automatically input into device 2. Consider, where the material being applied is for example, is an insecticide in response to an observed insect pressure, the data relating to the observed insect pressure, such as the type and number of insects, is data that can be collected and input into the device 2. Consider, for example that a modern tractor may be outfitted with a mobile metering device on board and a mobile N-sensor (nitrogen sensor) that measures the nutrient content of the plants in real time and quickly calculates how much fertilizer is needed and the sprayer on the back of the tractor sprays the correct dose of nitrogen fertilizer onto each "segment" of the field. The system 2 collects this location specific information from this high tech delivery system. In some cases, the material being applied may be being applied itself in response to predictive modeling, for example, where predictive modeling of insect migrations or drought patterns formed the basis for applying an insecticide or water to the corn crop, the data relating to such predictive modeling can be inputted into device 2 as well as the data relating to the application of the insecticide and/or water itself. Such predictive modeling may be used in the context of the present invention to manipulate other devices as well. For example, predictive modeling can be used in the planning and guiding of automated pruning machinery used in some crops to remove and thin portions of the crop or the material upon which it grows. In short, such predictive modeling can be used with any automated or robotic system. As will be appreciated by those skilled in the agricultural arts, this is also true of any historic pre-manipulation data stored in device 2.

Yet another example of a source of data is that of weather section 8 shown in FIG. 1. Several entities in the modern era track weather patterns. This includes governmental agencies such as the National Oceanic and Atmospheric Administration. This includes for-profit entities such as The Weather Channel. And other entities track the weather as well, of course. The tracking of this data and its effect on the corn crop being harvested in this discussion of the present invention has both historic and predictive value for the particular corn crop of a given season, but such data also has substantial predictive value when determining for the following year which crops should be planted where on the farm to provide the greatest profit yield. The value of this information generally grows over time, because the larger data pool increases the odds that any predictive modeling done with such data will be more accurate.

The data of weather section 8, provides an important segue into an important aspect of the present invention. Data, such as that generated by weather section 8, can find its way into device 2 from either direct or indirect paths. In other words, such data may be input directly into device 2 by weather section 8. Alternatively, such data may be inputted indirectly to planting section 6, as for example where the weather data is first sent to the computer of the farm equipment performing the planting operation, and such weather data is later inputted into computer housing device 2 by planting section 6 as part of its uploading of information into device 2.

Satellite and aerial section 10 represents another such direct/indirect pathway. Satellite and or aerial data itself is very substantial in its depth and reach in the modern era. Such data can include weather data, climate data and the like. It can also include global positioning data and the like. It can include infrared or other measurements, and can even include soil moisture and other information. Additionally, it can include simple pictorial data as well. There are providers who have developed the use of such data to assess the current yield of crops such as the corn crop of the current discussion, and even to assess the health and hardiness in addition to yield or other factors. Some forms of this data can be input into the device 2 directly. Other forms, such as global positioning, may be first sent to other entities such as the planting section 6 and/or harvesting section 12 and/or transportation section 16, for example, to be included with their respective uploaded information through their respective pathways into device 2.

Harvest section 12 provides data relating to when and where the crop was harvested, and importantly, the actual yields being realized from the harvest. Today's modern harvesting equipment, having onboard computer systems and sensors, provide real time data during the harvesting operation itself as to the yield being enjoyed from the harvest. When combined with global positioning technology, for example, and/or with planting density information, it is possible to determine with great accuracy which portions of the farm have produced the greatest amount of corn crop forming the basis of this discussion. In other words, existing high technology harvesters combine with GPS to generate a "yield map" for a given field which plots harvest by location. This data in turn can be manipulated with predictive modeling to predict the most efficient usage of the farm for the following planting season.

On-farm storage section 14 may include additional data, such as when and where the crop was stored, how, under what storage conditions and/or weather the crop was treated before, during or after storage with any protective or other materials.

Up to this point, the focus of the discussion has generally been directed to the planting and harvesting operations associated with producing a crop, even touching upon on-farm storage of a crop such as corn. As may be appreciated, the data will often vary with the type of crop being produced. For example, where the crop is in the vegetable family and is picked by hand, the identities of those involved in the picking process may be useful to know for tracking or other purposes, and there may be several more farm personnel involved in such an operation than the fewer combine operators usually needed to harvest a corn crop. The common theme here regardless of crop, is that in addition to the harvesting of whatever crop is involved, there is also a wealth of data to be harvested from that field as well.

The harvested crop must be moved from the farm of course. In some cases, this involves simple transportation to an end consumer, such as at a farmer's market and the like. In other circumstances it is moved to larger storage facilities such as grain operators and the like and/or on to food processors and the like. Thus, referring again to FIG. 1 there is shown transportation section 16 where data is inputted into the system. Regarding the data input from "downstream" of the distribution chain, the downstream distribution chain information is critically important to the farmer (or breeder or others upstream in the chain). The farmer has a vested interest in timely getting his crops to the ultimate customers in prime condition (not wilted, bruised, contaminated or the like) and the information from the transportation section 16 is helpful in tracking this. This information can be used in the real time decision making tool and predictive modeling tools, as well.

Figure 3:
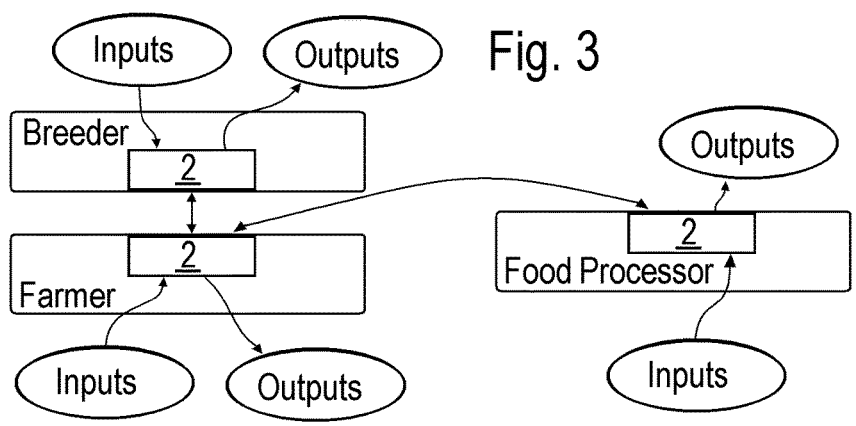
FIG. 3 is a schematic representation of a series of users of the system of the present invention in a chain of agricultural product production.

Additionally, it should be noted that the transportation section participants can, in one embodiment, have their own system according to the present invention and the farmer's device 2 will automatically transmit the relevant information to the shipper's device 2. The shippers device 2 will likely need only selected pieces of information from the farmer's device 2 that are relevant for the shipper's purposes. For example, a listing of the particular fertilizers, pesticides and insecticides may be very important for the shipper as part of the agricultural pedigree for the crop, but the shipper has little need for the cost/pound of the fertilizer or the labor costs for harvesting. FIG. 3 illustrates a representative simplified example of a chain of connected systems of the present invention each having device 2 set up by the respective user to obtain the desired inputs and outputs. The simplified example is of a seed breeder, farmer and food processor. It is noted that one of the inputs for the farmer is the information from the device 2 of the breeder and the food processor, and similarly one of the inputs for the system of the breeder is from the device 2 of the farmer. This embodiment of the present invention will not require everyone in the chain to maintain a complete system of the invention. FIG. 3 is to illustrate that t the individual devices 2s could and would integrate well together. Such systems will be optimized separately for the respective user depending upon the parameters needed for their operations. From the user's perspective there is little difference from having a single device 2 with multiple users having their own user defined dashboard or interface and the users each having their own device 2 onsite. A dashboard is a computer user interface in the form of a floating window (visual graphical interface) that provides contextual access to commonly used tools in a software program. However, from an overall standpoint, having a central single device 2 with user definable dashboards allows for easier collection and sharing of data as well as other advantages of a single central device 2.

Following transportation section 16 there are several additional sections, and in reality, transportation may be involved for each of those as well. And such transportation can take the form of ground transportation, but it can also take the form of any other form of transportation known in association with crops, including transportation over the ground, over water, in the air and any combinations thereof. In particular, shipment by truck, rail and/or shipment/transportation in ocean going vessels for export around the globe is to be noted in this regard. For the sake of simplicity, additional transportation section boxes are not shown in FIG. 1, but it is to be understood that transportation section 16 may be involved and typically are involved, in each step going forward. Data here includes when the crop was picked up, where it was transported, was it delayed in shipment, if delayed under what weather/storage conditions and whether such conditions might be expected to have an effect on the crop, were any other crops combined with this shipment, if so, what crops and when, and what was their pedigree (pedigree here referring to all aspects of how such crop came to be in existence and transported to this point), whether such crops were treated in any way before, during or after shipment. This certainly is not all of the categories of data associated with transportation section 16, but it does provide a representative overview of how widespread and substantial this data is as well.

The same holds true for off-farm storage section 18 and, if involved, food processor section 20. Government section 21 represents that government at the local, state or federal levels within the United States, and governmental entities around the world in their respective nations, are an integral section in today's food production orchestra. Whether approving agricultural products for initial sale (e.g. the United States Department of Agriculture (USDA's) role with genetically modified agricultural products) or export or importation (e.g. the United States Environmental Protection Agency (EPA's) role in evaluating and approving registrations of agriculturally active ingredients) or inspecting them for quality, size or other parameters, or investigating them for public safety (e.g. any of the law enforcement agencies) as in the case of diseases or intentional or inadvertent attacks upon or disruptions to the food safety and/or quality, or evaluating agriculturally active ingredients used in the production the government (using the term government in its broadest sense) 21 has a large role to play. The information government section 21 inputs or can use as an output is substantial indeed. This is true as well of the retail sale, distribution and export section 22 and consumption section 24 in terms of data generated or consumed at each step in their respective process.

It may be noted that retail sale, distribution and export section 22 places increasing demands on the system to have such information available for a given crop, with much of that desired on a real time basis. Reasons include, but are not limited to, traceability, namely tracking down and finding any sources of contamination in the process and liability shifting in accordance therewith, homeland security issues to track and find points of interception in the food supply, and to address inquiries from consumption section 24 and/or organizations such as those preferring organic foods or those concerned with the amount of energy or sustainability associated with producing the crop, e.g. carbon footprint groups. Increasingly important in the global agricultural economy are the MRL limits set by many importing countries. Those countries wishing to export to an importing country must often certify at the border or port that the crop being imported complies with MRLs set by the importing country, or the crop will be refused entry. It is thus easy to see why all of the data associated with the production of the crop, (its "agricultural pedigree"), either as a stand alone entity or if blended with other harvests (as is often the case with corn which is often blended with the harvest of several farms) the pedigree of all corn in the shipment, is vital to have collected and in a form that is presentable and useful and verifiable to the importing country so the shipment will be allowed entry. Thus, such retail sale, distribution and export section 22 and consumption section 24 are often keenly interested in some or all of the data generated in connection with the harvested crop.

Another section included in FIG. 1 is the carbon footprint section 26 which is primarily interested analyzing the amount of energy and/or carbon based fuels that were needed to produce the crop. It is interesting because of the many layers this section 26 can represent. Some in such carbon footprint section 26 may be interested only for example, in the energy consumed in transporting the crop, while others may be interested in tracking all of the data associated with the energy costs associated with producing, harvesting and storing the crop from its first day of planting forward. Thus the interests of members in carbon footprint section 26 can and do cut across and/or involve many of the other sections illustrated in FIG. 1. As pointed out above, there is room for flexibility in the number and titles of the sections of FIG. 1, and it should be pointed out that the carbon footprint section 26, because it is often associated with goals of achieving sustainable agriculture, might equally have been entitled the sustainability section 26, or that a separate sustainability section 27 might just as easily have been added to FIG. 1. This point highlights that while carbon footprint is becoming an accepted model to look at sustainability, it is only one parameter, and that sustainability as a whole, can include that and several other parameters, all of which contribute to the agricultural product's pedigree.

The technology section 28 is a representation of new data/information sources relevant to the modern era food production system that may utilize currently available technologies and/or advances, refinements, developments, improvements therein. In this section one would find technology companies and computer programmers and the like, though this section is certainly not limited to just those entities. The contributions of technology section 28 will, among others, make existing data sources/obsolete, lower costs of capturing data and/or provide new sections which can contribute to the Information Storage Device 2. Contributions of technology section 28 are expected to make Device 2 more accurate, informative, reliable, have a lower output cost, among others, and often will improve Device 2 to make it more robust while reducing the cost of, among others, of capturing, storing, manipulating and providing the needed information. Technology section 28 often functions as an "on ramp" or gate that new sections must pass through that allow such new sections to participate in the modern era food production system.

Some of the chief sections of the modern era food production orchestra have been set out in the above discussion for purposes of understanding the invention. But it is central to the present invention to appreciate that the present invention is not so limited. It is simply impossible to list here each and every person/entity/function associated with the production/harvest/distribution/transportation/storage/export/import/processing/consumption and all other aspects of the agricultural product's production and utilization. However, what is common across them all, is that at virtually each stage, data is generated. Like a symphony in warm up session, the device 2 taps the lectern to call them all to attention for a symphonic "interweaving of themes or harmonious arrangement" to coordinate the input, storage, manipulation and output of that data in a form that is useful to those having need of such information/data.

The input of data into device 2 can be manual. It is desirable if most or all of the data is inputted automatically. For example, where the farm implement of the plantings section 6 and/or the harvest section 12 collects data, the computer of the farm implement, in communication with satellites, cell phone towers or the like, can automatically upload its data to the device 2. This automatic inputting and updating is preferably true for each section in FIG. 1. Regarding inputting of data into the device 2, if it is manual as opposed to automatic, it is preferred if the system follows a computerized interview process, much like that of modern tax preparation software with the user where the user is prompted and counseled for what information is being requested, and then the system asks the desired questions to either set up the automatic downloads of information, or prompts the user for manual inputs of the relevant parameters in a format that is somewhat standardized so as to be usefully entered into the device 2, much in the same way that tax information in inputted in a manner useful to the Internal Revenue Service or other taxing bodies.

While data input can proceed by any number of communication channels and the present invention is not so limited, satellite communications, cell tower communications, wireless computer communications and the Internet, alone and in combination with one another, form some of the most powerful tools in the modern era to collect such information and provide it to device 2. Also, it may be mentioned here that any similar systems of data recordation and capture, such as bar coding and its scanners, may be employed to capture data for transmission to device 2 and any later developed technology performing this same function of communication of the data to device 2 is envisioned as within the scope of the present invention.

As noted above, device 2 is represented in FIG. 2 schematically as a single unit, and it may in fact, in one embodiment of the present invention, be a single computer or server. However, it is only essential that device 2 be able to collect, store and/or manipulate the data, so while it can arguably be a single computer, it is equally possible to be a network of linked computers and/or servers that can provide such function to collect, store and/or manipulate the data, and all are envisioned as within the scope of the present invention. The precise hardware selection is not limiting to the present invention.

The software necessary to operate device 2 may be one program, created, owned, operated and/or maintained by a single entity in a fashion similar to the model set by the Windows® operating system available from Microsoft Corporation. Alternatively, the operating software/programming may be communal shared software, not owned by a single person or entity in the nature of the Linux software model. Alternatively the software necessary to operate the device 2 may be a combination thereof. The access to and revenue derived from the output of device 2 may take several forms as within the scope of the present invention. In alternative embodiments of the present invention, the output of device 2 may be accessible to the public, accessible to only subscribers, accessible only to certain owners of the device 2 or combinations thereof. The data may be offered for free, for a charge or combinations thereof to some or all of the entities set forth in FIGS. 1 and 2. The output of the device 2 could conceivably be accessible in only one location or in several limited and secure or non secure locations. In one embodiment of the present invention, it is envisioned that access is rather broadly available as this tends to increase the usefulness of the device 2. Access may be had via any communications system, but the Internet presently represents the most efficient at the present time. Access is not limited to computers accessing the Internet. Newer technologies such as smart phones/cell phones with access to the Internet, I-phones from Apple Corporation, I-Pads and the like are envisioned as within the scope of the present invention for communication with and access to the output of device 2.

It is important to appreciate that device 2 is performing in the scope of the present invention, much the same function that the conductor provides for the symphony. Currently there are separated pockets of the data/information associated with crop production, all of which are useful in their own right. Like the strings versus the woodwinds versus the brass versus the percussion sections of a symphony, these individual pockets of information/data are useful. But to obtain the full measure of its value, it is necessary that these pockets of information be assembled into a device 2 which can collect, store and, preferably manipulate this information/data to provide a coordinated source of historic data recall and predictive modeling outputs that can be accessed and used by those associated with the production/harvest/transportation/sale/export etc of the crop. It is a lack of the conductor's coordination and the corresponding need it produces in the food industry, of which agricultural crop production is a subset that is addressed by the present invention.

Figure 2:
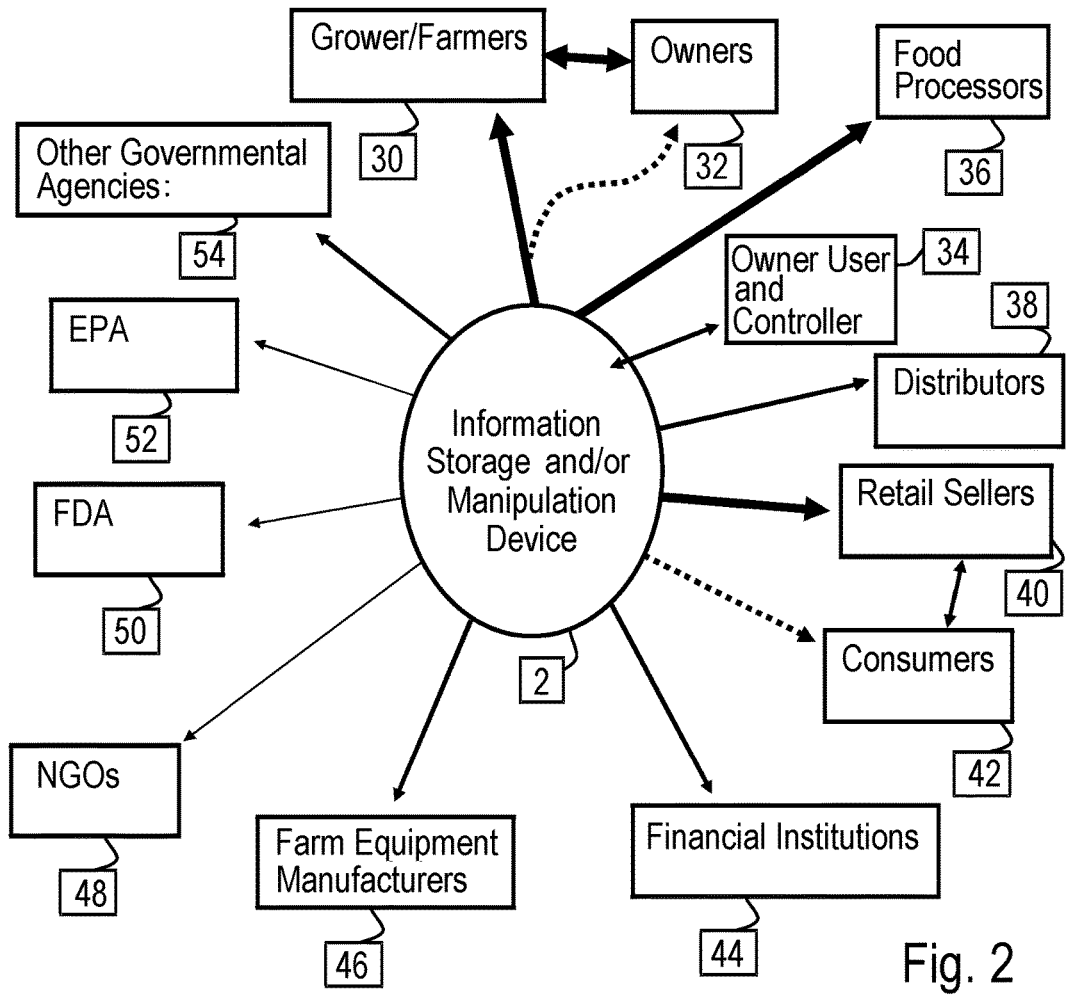
FIG. 2 is a schematic representation of selected "output" recipients/users of said data input in FIG. 1, prior to or subsequent to manipulation of said data by said information storage device.

Referring now to FIG. 2, while input into device 2 is critical, so too is output. FIG. 2 is a schematic representation of selected "output" from device 2 to recipients/users of the information/data that was input into device 2 as discussed in connection with FIG. 1. Such output can be prior to or subsequent to manipulation of said data/information by said device 2. Some of the recipients/users of the output from device 2 are the same as those who input information/data into device 2, but there are many recipients/users who make use of the information/data pre- or post-manipulation, that had no part in inputting information/data into the device 2.

More specifically, as illustrated in FIG. 2, grower/farmers 30 are one of the most logical recipients/users of the output of the device 2. Their uses are wide and varied, but even pre-manipulation, simple storage of the information and retrieval forms an important output of device 2. If the farmer wants to recall a certain growing methodology used, or active ingredients, or timing, or other basic information, it is all available in device 2. For such grower/farmers 30, indeed for any of the entities discussed in connection with FIGS. 1 and 2, another benefit of such stored and retrievable information is that as such information accumulates with time, it becomes possible to discern trends, particularly the subtle trends that cannot be otherwise easily observed, relating to food production and the entirety of the food supply and consumption chain. While that is certainly one important benefit of the present invention, another important benefit is manipulated output. For example, the grower may want to coordinate and compare events such as rainfall and its timing, disease spread and vectors, and the like in relation to application of active ingredients such as insecticides, fungicides, herbicides, fertilizers and the like for a time period such as the last growing season or last several growing seasons to obtain a manipulated result that can be provided in graphical or other form. The ability of device 2 to manipulate, data-mine, create relational databases and the like, allows device 2 to be much more than a simple repository of information/data. Manipulated output is not limited to growing parameters, but can include many other types of manipulation. For example, the manipulation can be directed to tracking the profit from a given crop/field and/or portions thereof.

Another important manipulated output to the grower/farmers 30 is predictive modeling that may or may not be tied with other external databases and information available over the Internet and other sources, to allow the grower/farmers 30 to engage in the "what if" scenarios described above. For example, the device 2 in one embodiment is designed to allow the grower/farmers 30 to select all or a portion of the farm, and in the selected portion to rotate or change the crop to be planted there in the coming year. The device 2 via the Internet or other means, determines current pricing and availability of the future crop both in terms of its cost of acquisition and its market selling prices, calculates the customary cost of active ingredients and manpower and other factors necessary to plant, grow and harvest such a new crop, optionally accompanied by projected yields based on weather data, history of performance of that selected portion of the farm and other factors, to arrive at a predictive model of what the grower/farmer 30 might be expected to obtain in terms of net income from producing the newly selected crop in the coming year on his or her own farm. In a similar fashion, the grower/farmer 30 can select other crops to determine the best fit in terms of profit, time, labor and whatever other factors are important to the grower/farmer 30 as he or she makes the decision as to what crop to plant in that section of the farm in the next year.

Profit is not necessarily the only benefit to the grower/farmers 30, and even where present, can be combined with other factors. For example, where a grower/farmer 30 on his or her own initiative desires to produce a crop with a lower carbon footprint, predictive modeling of device 2 can be used facilitate that analysis. If in the marketplace, food produced with the lower carbon footprint enjoys a higher sales price, this too can be factored into the device 2, to allow such grower/farmer 30 to determine if he or she might be able to create such lower carbon footprint crop, and yet still enjoy sufficient revenue as to engage in sustainable farming operations both from an environmentally friendly and/or an economic framework.

The present system operates well for evaluating a life-cycle assessment or LCA, also known as life-cycle analysis, eco-balance, and cradle-to-grave analysis, which is a technique to assess environmental impacts associated with all the stages of a product's life from-cradle-to-grave (i.e., from raw material extraction through materials processing, manufacture, distribution, use, repair and maintenance, and disposal or recycling). LCA's can help avoid a narrow outlook on environmental concerns by: Compiling an inventory of relevant energy and material inputs and environmental releases; Evaluating the potential impacts associated with identified inputs and releases; Showing the results to help operators make a more informed decision. The goal of LCA is to compare the full range of environmental effects assignable to products and services in order to improve processes, support policy and provide a sound basis for informed decisions. The term life-cycle refers to the notion that a fair, holistic assessment requires the assessment of raw-material production, manufacture, distribution, use and disposal including all intervening transportation steps necessary or caused by the product's existence. There are two main types of LCA. "Attributional" LCAs seek to establish the burdens associated with the production and use of a product, or with a specific service or process, at a point in time (typically the recent past). "Consequential" LCAs seek to identify the environmental consequences of a decision or a proposed change in a system under study (oriented to the future), which means that market and economic implications of a decision may have to be taken into account. Social LCA is under development as a different approach to life cycle thinking intended to assess social implications or potential impacts. Social LCA should be considered as an approach that is complementary to environmental LCA. The procedures of life cycle assessment (LCA) are part of the ISO 14000 environmental management standards which can be calculated with the system of the present invention for the desired agricultural product.

The predictive modeling may be pre-programmed into device 2, and/or it may be programmable to any desired extent. If programmable, it may be programmed in one embodiment, by those inputting information into device 2 and/or by those accepting, accessing or otherwise utilizing the output of device 2. Where it is programmable, in one embodiment any of the entities described in FIGS. 1 and/or 2 may conduct such programming. In an alternative embodiment, only a few, or even only one entity may be enabled or otherwise permitted to conduct such programming. Programmable predictive modeling enhances the usefulness of the present invention, as users of the device 2 can create custom inputs/outputs/reports and the like. For example, a salesman in one geographic area might want to make use of certain predictive modeling germane to his area of sales, while another might want to make use of such modeling for a different geographic area. Programmable predictive modeling provides such flexibility. The predictive modeling can include quite downstream or upstream users in the food supply chain. For example, even those involved with the production of genetically modified seeds can use such predictive modeling to analyze the cost of insertion of a genetic event in a plant or animal associated with the food and/or food by-product production, and use predictive modeling of device 2 to estimate production costs, profits and the like from such activity.

As may be appreciated, this is by way of example, and it is clear that the output of device 2, with or without manipulation of the data therein, can be used by the grower/farmer 30 and the remaining entities described in FIGS. 1 and 2 in a wide variety of ways. It is to be noted that not all grower/farmers own the land which is being farmed. In such instances where the land is owned by another, owner 32 as illustrated in FIG. 2 may want to use the output of device 2 in the same or similar manner as grower/farmer 30. A recipient/user of the information/data from device 2 that might be at first overlooked is the owner/administrator 34 of the device 2, illustrated in FIG. 2. The owner/controller 34 of the device 2 may, for example, coordinate the inputs and outputs to device 2 and in so doing provide a valuable service for which such owner/administrator 34 may derive an income from some or all of the recipient/users depicted in FIG. 2. Such income may be generated, as for example, with licensing fees, access fees, user fees, report fees or other means commonly known in today's information age for obtaining an income stream from information/data. In other instances, the owner/administrator 34 may desire to make the outputs of device 2 freely available to the public at large or to governmental agencies or others depicted in FIG. 2, as for example, output information/data that might assist the Office of Homeland Security or similar governmental entities involved in protecting the valuable food chain from the farm to its ultimate consumption by the end user of the crop.

Illustrated in FIG. 2 are food processors 36 who use the output of device 2 for several purposes of their own. Such output may include, again, (as for all entities depicted in FIG. 2), information/data in pre- or post-manipulation stages. Pre-manipulation data/information includes the history of the crop, where it was grown, under what conditions etc., essentially the entire pedigree of the crop, including factors not currently commonly available, such as its carbon footprint. By food processors it is meant here any type of food processor, including processors that simply transform the crop without cooking, seasoning or other preparation techniques, or those that prepare final food stuffs from the crop. For example, in the former category food stores may wish to clean or otherwise prepare the crop for sale. In the latter category for example, a wine producer may transform the grapes in to quality wines. In some instances it may be the same party performing both functions as for example where a vineyard raises its own grapes and processes them into its own wines. Manipulated data/information useful to food processors 36 can include forecasting manipulations to estimate how much of a given crop may be expected in a given region and how much it is expected to cost to purchase and or how much it may be valued for sale.

Distributors 38 are illustrated in FIG. 2 and in their function of moving processed foods from food processors 36 to retail sellers 40, they too may want historic non-manipulated information/data to determine the pedigree of the food they are distributing. Manipulated information/data is of value to them as well, as for example, predictive modeling of trends for a future time period, or collective relational data/information collated over past periods of time to again determine trends/patterns.

Consumers 42 have a wide variety of uses of pre-manipulation data, as for example where a given crop seems to them to particularly flavorful or otherwise beneficial, they may directly or indirectly access device 2 to determine the history and pedigree of the crop or processed food so that they can purchase the same in the future. Post-manipulation data is also valuable to the consumer 42, as for example, where the consumer 42 seeks predictive modeling, as for example, for supply or pricing.

Financial institutions 44 represents, in a fashion, an entire category of recipient/users, wherein when a financial institution 44 is seeking to make a decision regarding extending credit to other entities in FIG. 2, having access to simple pre-manipulation historic information/data, such as volume of crops produced over time in the past can be of significant value in making decision to lend or not lend and at what percentage loan rate. Manipulated information/data, such as predictive modeling that can be supplied by device 2 by taking into account factors such as the current cost of seeds and chemicals, current costs of production, harvest, transportation and sale, and the currently sales price enjoyed by that commodity, coupled with predictive modeling of where those factors may be expected to go in the future to support the loan, can make such manipulated data/information of great value to a financial institution 44 as an independent verifiable evaluation of the fundamentals of the transaction.

Similarly, farm equipment manufacturers 46 may use pre- and/or post-manipulation data to predict rises and falls in the need for farming equipment in various farming regions based on pre-manipulation information/data, post-manipulation information/data and/or combinations thereof. This allows farm equipment manufacturers 46 to manufacture to predicted needs or move leased/rental equipment to needed locations in advance of the development of the need. Similarly farm equipment dealers can stock up on commonly needed parts and supplies in advance of such need.

Collectively, public interest groups such as non-governmental organizations (NGOs) 48, and governmental organizations such as the Food and Drug Administration (FDA) 50, Environmental Protection Agency (EPA) 52 and/or other governmental agencies 54 form categories of recipients/users of the output of device 2. For NGOs such information/data may include historic pedigree information on the production/distribution/consumption of the crop. For governmental agencies, these interests would largely overlap, but yet may include additional needs such as those stemming from safety of the food supply. In that latter regard, historic existing data/information relating to the produced crop and its location in the process from planting to consumption can aid in distribution of supplies in an emergency or crisis. In a preferred embodiment, this information is provided in real time to allow determination of the precise status of the food supply at a given moment. Post-manipulation information/data is useful to predict trends, such as those of supply and availability in preparation of future problems/emergencies. Historic pedigree information can help law enforcement agencies track and bring to justice those who would tamper with the food creation/distribution process. Food chain safety is already of paramount importance to several governmental agencies, and is only likely to increase in the future.

Another output of device 2 would be output of pre-manipulation or post-manipulation data to service organizations or service individuals who address complaints of products used in the food supply chain. Device 2, among other benefits, provides much data/information, such as but not limited to satellite imagery that can be used to resolve complaints or prove a position in litigation. The output of device 2 could also be used with sales forces to identify fields where products used in the food supply chain may not work effectively, thereby reducing complaints. If for example, the complaints were associated with failure of an agriculturally active ingredient/formulation chemical (e.g. herbicide, fungicide, insecticide, fertilizer etc) to perform as expected, rather than simply apply additional applications of the agricultural chemical, the root cause might be more properly identified and addressed, thus reducing it to the one application versus two or more and its attendant environmental benefits. For the grower/farmers 30, and indeed for all those set forth in FIGS. 1 and 2, there would also be greater proof that each followed applicable stringent State and/or Federal guidelines with respect to chemical applications.

Yet another advantage of the present invention lies in its ability to assist with protecting the safety and sanctity of the food chain itself. There is the discussion above of how the data/information resident within device 2 can assist law enforcement and governmental agencies, and that is certainly true. There is growing acceptance among the many participants in the food production/food supply chain, that managing data/information relating to the food chain, from the creation of starting materials, such as seeds in the case of a seed-based agricultural product, through harvest, processing, distribution and final consumption, in short, the entire food supply chain, has value. Often termed food safety, or food distribution tracking, or food traceability, there are efforts by the food production industry, NGOs and government to track food throughout the entire production and distribution process to ensure its integrity. For example, S. 510, the FDA Food Safety Modernization Act of 2009, is the Senate's effort to provide food-safety legislation that is intended to reduce the risk of contamination and thereby better protect public health and safety, raise the bar for the food industry, and deter bad actors. S. 510 was stated by some to have the goal of providing the U.S. Food and Drug Administration (FDA) with the resources and authorities the agency needs to help make prevention the focus of food safety strategies. Among other things, this legislation required food companies to develop a food safety plan; it improves the safety of imported food and food ingredients; and it adopts a risk-based approach to inspection to improve the safety of the food supply and enhance consumer confidence. Assistance with this initiative is one important function that can be accomplished by device 2 of the present invention, sitting as it does, in a sense, somewhat like a spider at the very center of the food supply and distribution web.

As may be appreciated, each of the recipients/users of information/data illustrated in FIG. 2 from output device 2 may have a role in the input of their respective sets of data as well. And each may use only pre-manipulation data, only post-manipulation data or combinations thereof. Neither FIG. 1, nor FIG. 2 is meant to be exhaustive representations of each of the groups involved in the input and/or output of data/information into or out of device 2. They are representative only, and many other groups, subgroups or others in the entirety of the food supply chain are included as within the scope and spirit of the present invention even if not specifically named or set forth in FIGS. 1 and/or 2.

Technology is expanding at an unprecedented pace, and linking of technologies is also occurring at unprecedented rates. It is within the scope of the present invention to employ these unfolding technologies as they develop. For example, where the crop is an apple or orange, bar coding or other similar technology which is unique may be employed to a bar code strip on individual pieces of fruit that falls within the scope of the above described invention. Such bar coding can be placed on the fruit at any point during its growth, harvest and transportation to processors or end consumers. In one embodiment of the present invention, where the fruit is to be sold to an end consumer, as for example in a grocery or other store, it is valuable within the scope of the present invention to have bar code or other reading mechanism associated with the fruit that carries all of the information that an end consumer may want in terms of the fruits pedigree that led it to be there on the grocery shelf. This includes any/all of the information described herein. As far as readers/blending of technologies, in this example the information may be present as, for example a QR Codes reader. Such readers are currently used in a broad commercial context, including both commercial tracking applications and convenience-oriented applications aimed at mobile phone users (known as mobile tagging). Users with a camera phone or I-Phone or similar apparatus, equipped with the correct reader application can scan the image of the QR Code to display text, contact information, connect to a wireless network, or open a web page in the phone's browser. This act of linking from physical world objects is known as a "hard link" or physical world hyperlinks. Such technology may be employed to place the QR Code on the fruit, which the shopper scans with his or her phone, to be linked to a web site providing all such data to the shopper as the shopper may desire to make the purchase. Alternatively, instead of a shopper, the fruit may be at the facilities of an exporter, who performs that same function with that same phone or any other device to determine if the fruit meets the MRL or other requirement of where the exporter would like to ship the fruit. In short, it is within the scope of the present invention to employ any or all of these known and emerging technologies and linking of such technologies to provide the objectives of the present invention.

In yet another embodiment of the present invention there can be linking of entire areas of the present invention. For example, where such QR codes are employed, and the crop is lettuce or tomatoes, if it has been determined that the lettuce or tomatoes have been accidentally or intentionally harmed, as for example with E coli, the consumer at the above described grocery store can scan such produce with his or her camera on his or her I-phone and use a code such as but not limited to a QR code to be linked to a website where warnings associated with that particular pedigreed crop can be traced and the appropriate warnings can be generated and given to the consumer.

The above description highlights a number of aspects of the present invention. Selected portions of these aspects are discussed again below to further elucidate these particulars of the present invention.

The invention provides a method and associated system for establishing an agricultural pedigree for at least one agricultural product, wherein the agricultural pedigree is a collection of the information associated with the origin and history of an agricultural product, from its earliest of stages of creation of its starting materials (e.g. for seed-based agricultural products it would be the creation of the seeds, for example) through its production, harvest, distribution and final consumption, and may be considered a record of some or all of the inputs, treatments and processes performed on or to a given agricultural product in its production and distribution, some or all of which may be selected and/or defined by one or more entities making use in one or more ways of such Agricultural Pedigree The agricultural pedigree inputs can be set by a user in response to customer or user or other desires, or dictated by vendors for establishing or maintaining business relations, or dictated by governmental agencies for regulatory compliance. The method includes providing an open communication network accessible information storage device 2, such as a computer coupled to the internet, adapted to receive input of data relating to agricultural product production and distribution from multiple sources, as represented in FIG. 1. The method includes inputting said data into said information storage device 2 manually or automatically, as discussed above. The method includes storing and, optionally, manipulating, said data in the device 2 and providing access to said data, pre- post- or both of its manipulation, via the open communication network, such as the internet to one or more entities as represented in FIG. 2. The method and associated system of the invention provides that the information storage device 2 is configured to be used as at least one of: a tool for traceability of at least one agricultural product, a tool for establishing and/or confirming the agricultural pedigree of the agricultural product, a real time decision making tool, and a predictive modeling tool.

Traceability of the products is the ability to track agricultural products throughout the production and distribution chain. The maintaining of the agricultural pedigree allows the system to easily accommodate any traceability requirements as each participant in the chain is maintained in the pedigree.

The system can be used as a communications tool or a device improving communications as the system can be easily used to co-ordinate harvesting with shipping. For example a farmer can use the system to identify a need for his agricultural product at a certain location and a certain time, and the he or the system can manually or automatically calculate when select portions of the agricultural product that the farmer is growing, are best timed for harvesting and being made available to shippers/distributors 38 to ensure they are delivered to the shippers/distributors at the most useful moment and at a time which will ensure shipment and arrival to the entity desiring the agricultural product when the agricultural product is at its peak in terms of freshness or other relevant parameter. This is particularly useful for international shippers/distributors who must carefully consider the long transit times and distances involved avoiding loss of their shipment due to spoilage or other factors. While a farmer can use the system of the present invention to his advantage as just described, so too, alternatively shippers, who often combine shipments and must often delay transportation until they have received the agricultural products from the grower, can co-ordinate with farmers that they, the shipper/distributor, have excess or minimal shipping capacity. For example, the shipper may have received 5% more harvest than originally budgeted from one farmer and he can timely convey this to a second farmer who adjusts his harvest to maintain the crops that could not be shipped in the field for a supplemental harvest (in a week, for example), thus saving on storage and improving product "freshness." These are merely representative examples of the communication possibilities with the present system to improve agricultural product flow. The opportunities here are virtually limitless.

The maintaining of the agricultural pedigree allows for the system to evaluate a sustainability measurement for the agricultural products, which may be in one embodiment of the present invention according to predefined or preselected sustainability parameters, which were predefined or preselected by any number of individual or combined entities. For example, several leading food companies have made sustainability, or sustainable agriculture, a top priority, and often view their farm level agricultural supply chains as the biggest opportunity for improvement. It is important to have quantifiable measurements for this priority; however this is not easy. Measurements/ratings of sustainability can be changing according to agreed upon norms, or technology or development of scientific knowledge, and is currently in a great and rapid state of evolution. Even as evolving sustainability measurements attempt to pinpoint the proper measurement of agricultural stewardship, the maintaining of a comprehensive agricultural pedigree allows for constant evaluations of such sustainability measurement for the agricultural products according to such designated sustainability parameters. In addition to evaluating how a given agricultural product has satisfied the goals of agricultural stewardship with appropriate levels of sustainability, farmers often wish to properly plan future agricultural products with sustainability in mind. The present invention contemplates that the evaluating of a sustainability measurement for the agricultural products is, at least, part of the predictive modeling tool.

The maintaining of a comprehensive agricultural pedigree that is capable of transferring with the agricultural product also allows the system to evaluate compliance of the agricultural products with preexisting standards in accordance with predefined standard requirements. For example if a shipper receives an order from Chile for a given crop, the shipper can use the system of the present invention to evaluate whether a farmer growing that crop in the United States satisfies the Chilean import requirements for such crops simply by evaluating the information in the system of the present invention, which in a preferred embodiment has been placed there in real time, allowing the shipper to make an immediate decision as to whether to contact that U.S. farmer to negotiate a purchase of some or all of the U.S. farmer's harvest of that crop. A vender, such a large grocery store chain, may likewise have particular compliance standards that can be easily checked and verified with the agricultural pedigree by any interested party, including the farmer, the shipper/distributor, the consumer, the government, etc.

The system preferably incorporates a real time decision making tool and a predictive modeling tool. The real time decision making tool can calculate essentially any of a number of parameters of the associated agricultural product, including but most certainly not limited to sustainability measurements according to optionally predefined variables, a profitability measurement based upon total costs and current product price, a total water usage measurement for crop production, a total carbon footprint measurement for the agricultural product's production, and a risk management measurement for the agricultural product's production (such as profitability/loan amount). The predictive modeling tool can similarly predict essentially any of a number of parameters of the associated agricultural product, including predicted sustainability measurement according to predefined variables, a predicted profitability measurement based upon total expected costs and expected product price, a total expected water usage measurement for the agricultural product production, a total expected carbon footprint measurement for the agricultural crop production, and an expected risk management measurement for agricultural product production (such as profitability/loan amount with a range of uncertainty).

One important aspect of the present invention is inputting, automatically or manually, contemporaneous inputs into the agricultural pedigree system over time throughout the production and distribution of the agricultural products. The contemporaneous data inputting increases the accuracy and reliability of the data allowing the system to be better utilized to verify compliance with certain conditions. Backtracking to find data at a later point to determine a compliance parameter naturally has considerably less reliability.

Another important aspect of the system of the invention that is preferred is the use of an interview process, which is preferably a computerized interview process similar to that of current tax preparation software's interview process, for inputting data and setting up data inputs. The interview process assures that the operator does not miss critical inputs and allows the operator to modify the system for his particular needs by omitting data not needed for his particular business sector. Further, in the case of the computerized interview process, it will allow the user to set up his own display as a personalized dashboard of results, parameters, or the like that are relevant to that operators business.

Another important aspect of the system of the present invention discussed above is the step of using at least one of the predictive modeling tool and the real time decision making tool to facilitate risk sharing associated with the production of the agricultural product by validating the risks associated with the production of the agricultural product in an independent verifiable manner. This system offers an important standard for documenting loans of recourses based upon future agricultural production.

A further important aspect of the invention is allowing access to the information storage device to and communication between those in the chain of production including at least access to agricultural product harvesters, packagers, transporters, processors and distributors, and communication between at least agricultural product harvesters, packagers, transporters, processors and distributors.

As noted in the summary of the invention a user definable grid for agricultural products allows for a series of unique applications of the present invention. The device 2 of the invention will preferably allow users to designate subsections of their fields/property into identifiable subsections, referred herein as a user definable grid. Each grid of a user's field can also be called a sector. One implementation of the user definable grid could utilize the Universal Transverse Mercator (UTM) geographic coordinate system. The UTM is a grid-based method of specifying locations on the surface of the Earth that is a practical application of a 2-dimensional Cartesian coordinate system. The UTM system employs a series of sixty zones, each of which is based on a specifically defined secant transverse Mercator projection. In a UTM user defined system the user need only define the grid size. A further implementation of the user defined grid system would allow user to specify at least a longitude origin, a scale, and possibly "false northing" or "false easting" (which allows for rotational orientation of the separate grid). The user definable grid need not be limited to traditional gridworked grids. For example can use a map interface to identify segments, such as tracing around an area on a map representation to form one "grid", such as the colloquial "north forty." Thus there are several manners in which users can easily create their own local grids on the device 2. The user definable grid can be a particularly useful when the system of the present invention is utilized as a traceability tool, wherein the user defines a grid of product source.

The user definable grid has further application in improving pesticide application in agricultural product growing on a grower's field. Pesticides are expensive and there is a general desire to limit their application to that which is necessary for healthy production. With a user definable grid for the grower's field, the system can utilize the inputs for determining, for at least one, and preferably all user defined grid designation unit the pesticide requirements based upon real time data, predictive modeling or combinations thereof. The system can be used to communicate these grid specific pesticidal requirements to a pesticidal applicator, such as a tractor with a controllable distributed pesticide applicator. The pesticidal applicator can then apply pesticide compounds to the specific grid designations in accordance with said pesticidal requirements for the associated grid. The system gains greater control over pesticide application and can be very effective at minimizing overall pesticide applications.

The user definable grid has further application in improving harvesting agricultural products. The system allows for maintaining the Agricultural Pedigree for grower's field's product by grid designation of the user defined grid. This information can also yield a selective harvesting of the field based upon distinctions in the Agricultural Pedigree via grid designation. The system of the present invention allows the farmer to address the health and progress and harvesting of their fields as a whole and practically down to plants on an individual basis through maintaining information on a user defined grid designation.

Following are non-limiting examples to more fully explain the present invention. Departures from these specific examples remain within the spirit and scope of the present invention.

EXAMPLE 1

General Example

In this prophetic example, an agricultural pedigree is created as follows. A seed provider breeds an improved corn plant variety for sale, Such breeding may be traditional breeding, or involve genetic manipulation/modification or both. The seed provider coats the seeds with an insecticide and other coatings, and bags the seeds for sale to the seed retailer. Prior to the shipping of a bag of the seeds to the retailer, the seed provider inputs relevant data into the information storage and/or information manipulation device 2 of the present invention. One implementation of the device 2 is through a SaaS model that the seed provider accesses as a customer with their own customizable dashboard. The information added into the device 2 includes information on the seed variety, genetic modifications or stacking of genes, if any, the dates grown, the dates seeds were harvested and how it was done, the coatings and the amounts of each placed on the seeds and when they were coated, when the seeds were bagged, including the make up of the bagging material and its characteristics, and any other information deemed relevant to the agricultural pedigree by either the seed provider, or by those along the chain from planting to consumption of the crop, or related thereto (such as U.S. Food and Drug Administration or the U.S. Environmental Protection Agency, for example).

In a preferred embodiment the bag includes a scanable tracking means, such as a barcode. The seed provider schedules the bag of seed for shipment to a seed retailer. The shipper scans the bar code which tracks the moment of pickup and that information is sent via cell phone technology to the device 2. The shipper may have their own user definable dashboard interface with the device 2 for recording and displaying those parameters relevant to the shipper. A global positioning device tracks the route the seed bag takes from the seed provider to the seed retailer, tracking any delays or stops, and sensors in the transporting unit (e.g. car, truck, ship, etc) and/or within the seed bag record parameters desired to be tracked, as for example but not limited to, temperature or humidity or other conditions. This information is sent via cell phone technology to the device 2. The seed retailer, upon receiving the seed bag(s), scans the bar code(s) to record receipt of the bag of seed which is also sent either via wireless computer technology or cell phone technology to the device 2. The retailer, likewise, may have their own user definable dashboard interface with the device 2 for recording and displaying those parameters relevant to the retailer. A farmer purchases the bag of seed from the seed retailer and takes the seed back to his farm. On at least one of his farm equipment, (e.g. either on the tractor, the seed planter or both) is a scanning device. The farmer scans the bag of seed which records the seed's insertion into the farmer's planting equipment. The date and time of planting are recorded by a timing device on the planter or tractor, and this information is recorded either on the tractor's computer and sent to the device 2, or is sent directly via cell phone technology to the device 2. The farmer, like others in the production chain, may have their own user definable dashboard interface with the device 2 for recording and displaying those parameters relevant to the farmer. Also included in the farmer's tractor or the planter is a global positioning device which records where the seeds are being planted, in which field or portion of field of the farm, the depth, the spacing of individual seeds and rows of seeds and any other information deemed relevant to the agricultural pedigree. The weather on the day of planting is recorded from a number of sources accessed by the device 2, such as the National Oceanic and Atmospheric Administration. Additionally, and optionally, the farmer has included sensors on the farm which measure the humidity, temperature and other parameters throughout all or a portion of the growing season, and this too is sent either directly to the device 2 or to the farmer's tractor and then to the device 2. Throughout the growing season, each time the tractor is used to treat that area of the field, what the tractor is doing is recorded by one or more of sensors on the tractor, sensors on the equipment pulled or otherwise used by the tractor (e.g. sprayers etc) or by sensors on the farm itself. Thus with any application of water, agricultural chemicals including fertilizers, insecticides, fungicides, herbicides and the like, this information is collected by the farmer's equipment, preferably using scanning technology on the containers of the materials being applied which is simply scanned in by the farmer, and all of the collected information is sent to the tractor and then to the device 2 or is sent directly via cell phone technology to the device 2. As may be appreciated at this point, when harvesting time comes, all aspects of harvesting, including but not limited to date, time, portion of field, yield, weather, days from original planting, size of kernel, etc, are recorded by the equipment and/or the tractor and then sent to the device 2, or are sent directly to the device 2. If recording from a specific portion of a the field (which may be in the form of a user defined grid of the overall field) is required for any reason, some or all of the crop can be hand-picked, a global positioning system coupled with a labeling system and printer creates a bar code in the field, and the hand-picked crop is placed in containers with the bar code applied thereon so that even the portion of the field in which it was grown can be identified. Additionally, information such as who did the picking and whether any sanitary or other safety measures were employed can be among the captured information as well. While unusual for corn, this of course may be quite applicable to other crops, such as strawberries for example.

The harvested corn is stored on the farm, and a sensor on the storage device records when the corn was placed in the silo, the size of the silo and volume filled, are measured, whether any conditioning of the seed occurred as it went into or out of the silo is recorded, such as whether it was treated with insecticides or fungicides, and if so, how much and how was it treated, also for example, the airflow in the silo is recorded, a timing device records how long it remained there, a global positioning device records where it was stored and all of this information is communicated to the device 2, directly or through intermediate equipment. Again, other information, such as the weather conditions throughout the storage period can be accessed by the device 2 manually or automatically, and recorded as part of the agricultural pedigree of this harvested corn crop.

The farmer desires to sell his crop, and while he could certainly use existing methods, such as calling his normal purchasers, instead he uses the device 2. He alerts the device 2 that he is ready to sell his crop, which in turn is in communication with a network of those who could purchase the crop. The farmer can have a set price, or bidding can begin, or the device 2 can access a third source, such as a standard commodity pricing index relevant to the sale at that time. Alternatively those who would purchase can receive bids from farmers, selecting the lowest bid that meets their needs. Via the device 2, the sale can be consummated, and the device 2 can automatically then contact shippers to alert them to come to the farm to get the crop. Here too, the device 2 can be used to provide the best price for shipping to the farmer or the shipper. When the shipper arrives at the farm to obtain the load, here too the date and time of pick up, path of transport, and time of transport, how much was sold and how much is left for sale can all be recorded and placed into the device 2, adding to the agricultural pedigree.

In order to provide evidence of sustainable agriculture and/or other parameters, such as carbon footprint, the information provided to the device 2 relating to the farmer's methods relating to growing, storing, treating and handling the crop can be used by the device 2 to calculate a sustainability rating according, in a preferred embodiment, to an agreed upon sustainability scale, much like a Richter earthquake or diamond clarity scale. In other words, preferably, a commonly accepted methodology for assessing sustainability with predefined parameters has been agreed upon by those associated with the agricultural industry, the device 2, using those parameters, can provide a sustainability rating for that farmer for that crop. It can also compare and contrast based upon adjacent or nearby farms and/or regionally and/or nationally and/or internationally all based upon the agricultural pedigree information contained within the device 2. The device 2 can use data it acquired from the tractor, equipment and sensors on the farm, such as the amount of fuel and oil consumed by the tractor or other equipment in the production of the crop. If such automatically uploaded information is insufficient, the device 2 can be used by the farmer in a structured interview process, much like today's tax preparation software, to guide the farmer into providing any relevant and needed information in a way that will be common to all farmers and in a way that is useable to the device 2.

As may be appreciated, while the device 2 can be a series of separate computers, in a preferred embodiment it is available in the manner common to today's application software where all those inputting and extracting data do so from the applications software provider who maintains the device 2.

Upon obtaining the corn crop from the farmer, the shipper transports the corn crop to its desired destination, which in this example, is a food processor. As may be appreciated, in a similar fashion as outlined above with other phases of transport, times, dates, routes of transport, temperature (ambient or temperatures within the load via sensors) and more is all recorded and provided to the device 2 to add to the agricultural pedigree. As the food processor processes the corn into a different end product, in a similar fashion, its processing and other equipment uploads information relevant to the agricultural pedigree to the device 2. Similarly, for any information not otherwise available via such uploading, the food processor is taken by the device 2 through an interview relevant to the food processing industry for this type of food processor to obtain the relevant information in a useable fashion. Here too, the device 2 is used to establish a sustainable agriculture rating for the food processor.

The food processor is then in a position to send its processed food to a food retailer, and again, the food processor can use traditional routes, or can use the device 2 of the present invention to alert would be purchasers that it has processed product ready for sale. Again, the food processor can set a price, the purchaser can set a price, the device 2 could access a pricing index relevant to that product or bidding could occur by either a series of food processors all wishing to sell their product or by a series of purchasers wishing to purchase the product, which can be coordinated via the device 2, with the sale consummated there as well.

Again, as with the above, shippers can be automatically notified, shipping prices established in a similar manner via the device 2 and the processed food product is shipped to the retail sales store for sale to a consumer. Where, for example, the retail sales store desires to purchase foods having the best sustainable agriculture rating, the ratings of the seed provider, farmer, food processor and any transporting companies there between can be added or otherwise blended to provide a sustainable agriculture rating or carbon foot print rating or the like. The retail sales store may desire to place some or all of this information on the product being sold, as for example via a bar code or other scannable technology. In this fashion, a consumer wanting to purchase the product can use any scanning device, such as those presently available even on the common "smart" phone presently available, bar tags and radio frequency identification tags, and there at the retail sales store, the consumer of the food product can make purchasing decisions on such information from the agricultural pedigree as is available via said bar code or similarly functioning technology. Alternatively, the consumer may be placed in communication with the device 2 to access any portion of the agricultural pedigree desired to be viewed by the consumer. As may be appreciated, an economically driven sustainability model is possible in which agricultural products of high quality grown sustainably may command or extract voluntarily from the consumer, a higher purchase price. This can be particularly useful if the sustainable agriculture actually cost more to produce, and, arguably, these higher sales prices would carry higher margins, thus providing an economic incentive for all those involved in bringing the product to the consumer. to employ sustainable agriculture. Alternatively to encourage a consumer to purchase products of high sustainability, such products may carry a lower sales price to encourage the consumer to spend his or her income on such sustainable agriculture, providing the appropriate economic incentives are in place for those involved in producing the agricultural product and bringing it to the consumer. As may be appreciated, in this example, not only is the agricultural pedigree established, but the traceability tool is also established in this manner. Still further, timely, even automatic uploading of some or all of the data in the agricultural pedigree has operated in this prophetic example to provide decision makers along the chain, from the seed provider, to the farmer, to the food processor, to the retail sales store, to the consumer, to the shippers, transporters and others in the chain, with a real time decision making tool or platform from the device 2.

EXAMPLE 2

Just in Time Harvesting

A retailer or distributor in another country realizes a need for a highly perishable agricultural product that will have to be transported a substantial distance internationally. The retailer (or distributor) could contact an international shipper directly or a commodities broker in the traditional manner, but in this example, the retailer/distributor has access to and utilizes device 2 as described in Example 1. The retailer/distributor could broadly alert international shippers of its needs, or could alert a more limited set or even a single shipper perhaps known to the distributor/retailer. In this example, the retailer/distributor notifies directly via device 2 via the open communications network, an international shipper known to the retailer/distributor. The international shipper of ocean going vessels realizes it has a vessel that will be ready to disembark for transport to the retailer/distributor at a date four weeks into the future. The shipper accesses device 2 via the open communication network, and places a notice of the quantity and type of agricultural product with which it is desiring to fill its vessel, and of the date and time the vessel will leave port, and its destination, and the shipper is presented with a choice of either inputting the maximum price the shipper is willing to pay for the agricultural product or starting a bidding process in which the shipper is presented with bids from farmers enabling it to seek the agricultural product for the lowest bid. The shipper selects the option to state a price it is willing to pay, and this is recorded in the device 2. The device 2, is populated with data allowing it to ascertain that for this type of agricultural product crop and for its destination, there are certain requirements that are established and must be met. For example, the shipper specifies a certain sustainability rating. The country of destination has set a maximum residue level (MRL) for materials that are commonly used to treat that agricultural product. Other parameters such as size, color, brix are specifications/parameters that can be set by the retailer/distributor. The retailer/distributor may even offer to pay a premium if certain parameters, such as a certain desired sustainability rating, carbon footprint, water usage level, etc., can be had, (particularly for example a reliable sustainability rating of the type established by the device 2 for the reasons described elsewhere in this application).

A first farmer, also accessing device 2 via the open communications network, has such agricultural product in her field, and so she attempts to offer to fill a portion of the shipper's need. The device 2, locates the agricultural pedigree for that product for that farmer, and further applies the sustainability rating filter set by the shipper and the MRL filter set by the country of destination, and concludes that this farmer's agricultural product will meet the criteria set, and proceeds to facilitate the making of the sale between the farmer and the shipper. Upon consummation of the sale, this farmer knows that in order for the agricultural product to reach the vessel at its optimum time, given that the agricultural product has a long transit time upon embarking from port, the farmer should harvest the crop 12 days before the vessel's scheduled departure. In this way, the farmer and the shipper communicate via device 2 for a just in time harvesting to shipment relationship.

A second farmer, attempting to fill another portion of the shipper's needs, also has its agricultural pedigree examined by the device 2, and it is determined by device 2 to have easily met the MRL standard for the country of destination, but the sustainable agriculture rating of this second farmer is outside the range specified by the shipper and/or retailer/distributor. The device 2 can either be programmed to not permit the sale to go further, or it may be programmed to communicate this to the shipper to allow the shipper to determine for itself or in consultation with the retailer/ distributor whether either will waive that particular parameter, or it may be programmed to give the shipper the choice of these courses of action.

In this example, the device 2 is programmed to advise the shipper of a potential order but note that the sustainable agriculture rating is not within the shipper's specified range. The shipper can use this point to re-negotiate the sales price of the material, or may waive that parameter, and the second farmer then knows that given his distance from the vessel, he will have to harvest his crop 14 days before the vessel's scheduled departure date, and again, in this way, the second farmer and the shipper communication via device 2 for a just in time harvesting to shipment relationship.

As may be appreciated, there is benefit here to both the shipper and the farmer. The shipper will have the agricultural product when it is needed and with a surety it will be accepted at its country of destination. The farmer is assured, even before harvesting the agricultural product, of a sure and certain sale and of the optimum time for harvesting in relation to shipment. Further in this example, the end consumer in the country of destination purchasing the product from the retailer/distributor is provided with the scanable bar code enabling it to determine what farmer provided this product, and because the product has arrived at its peak moment of use, the farmer's reputation is enhanced. Conversely, if shipping or other delays affect the quality of the agricultural product outside of the control of the farmer such that the agricultural product is not so good, or fresh or fails to meet some other important parameter, the farmer, accessing the agricultural pedigree can determine that it was due to delays in shipment, not his or her agricultural product, that was the cause of this less than optimum result.

In this example, the first and second farmer fill the shipper's need for the agricultural product, but yet at different quality and different price points.

A third farmer attempts to offer to fill the shipper's need, but is advised by the device 2 that the shipper's needs for the agricultural product have been filled. While this third farmer, in this example, will not have made the vessel or the sale, there is benefit still in that this third farmer had not harvested his agricultural product hoping to make a sale, only to have a highly perishable product at risk. This third farmer can look for another shipper having need of that product, so that this third farmer too can enjoy the benefits of a just in time, harvest to shipping relationship.

EXAMPLE 3

Predictive Modeling

In this prophetic example, a grower having grown corn on a large portion of his farm desires to convert a portion of his farm to the production of wheat. Utilizing global positioning devices and input from the grower, or by the grower's inputting of latitude and longitude lines, or by way sensors placed about the farm that provide coordinates on a grid, or by graphical user interface or other means, the device 2 understands the geographic footprint of this grower's farm. Still further, due to maintaining an historical account of the corn grown by that grower on that farm from its agricultural pedigree resident in device 2, the device 2 contains a record of past yields in all or a portion of the farm of the corn crop. In a preferred embodiment it maintains the agricultural pedigree for adjacent or nearby farms, or similar farms situated regionally, nationally, or globally, In a preferred embodiment, the device 2 can correlate such information based upon filtering qualifications selected by the user of the device 2, selected by the device 2 or both, as described more fully below.

Utilizing a graphical user interface, or other means, the grower highlights that portion of the farm that he is thinking of changing from corn to wheat. The grower is presented with the option of being taken through an interview process by the device 2 or to input information of his own choosing. Such information can include labor rates, energy costs, rent, fertilizer costs, seed costs, pesticidal active ingredient costs, seed costs, equipment costs, etc. This farmer chooses the interview method; where upon the device 2 acquires certain information from the grower by conducting a computerized interview. Such information can include the price of wheat seed in the grower's geographic area. If the grower is not aware of a figure, the device 2 accesses published sales prices of seed sellers in that grower's area and provide the missing information. Optionally, if the grower does not agree with that price, he can override it. In a similar fashion, other data is either provided by the grower, provided by the device 2 from the information already stored on device 2, or can be accessed by the device 2 over the open communication network, such as information which can be of a general nature (such as published prices for seeds or published indexes for the sales prices of various crops). Or the information collected or correlated during the interview process can be specific to that farm based on past agricultural pedigree information resident in device 2. As may be appreciated, such information is not limited to just the preceding data, but may include weather data, information on the wheat varieties with identification of those performing particularly well in the area, pesticidal compounds used to treat the agricultural product that appear to have been shown to be particularly effective in the area, among others. At the end of the interview process, the device 2, utilizing predictive modeling, can provide the grower with an accurate estimate of what that grower might expect to realize in profits if such a portion of his farm were converted to wheat. Still further, if the farmer needed additional equipment to purchase or lease in order to plant or harvest a wheat crop, the device 2 can be configured, preferably during the interview process, to determine those needs and factor them into its final predictive model of what the grower may hope to realize by converting the identified portion of his farm from corn to wheat. Similarly, the device 2 is programmed, in this example, to locate and identify adjacent and/or nearby farms, or farms regionally, nationally and/or globally similarly situated that that grew wheat in the past and, based on its/their agricultural pedigree, considered alone or in combination, to utilize that information to further refine and improve the predictive model/assessment it provides to the farmer making the predictive modeling inquiry.

EXAMPLE 4

Risk Assessment/Modeling

In this prophetic example, the grower of Example 3 has assured himself that wheat will significantly increase his profit, and he decides to convert a portion of his farm to wheat. However, he will have need of a major capital expenditure to purchase certain equipment to enable him to plant and harvest his wheat, and he needs a loan from a lending institution to purchase the equipment.

The grower may use traditional methods to support such a loan, but in this example, the grower approaches a lender in his area seeking such a loan. The lender is also in communication with device 2 via the open communication network, and with the grower's permission, views the predictive model originally provided by the device 2 to the grower. Because the predictive model has greater accuracy than has heretofore been possible from the many advantages of the device 2 as set forth above, including but not limited to its access to agricultural pedigree information and/or sustainable agriculture information for that particular farm, and for comparative purposes, with other similar or somewhat similar farms on a regional, national or international basis. Also, utilizing information resident within device 2, and information available to it over the open communication network, the lender is also quickly assured that this is a sound business plan here. However, the lender in this prophetic example holds the fear that the grower may have been too optimistic in some of his assumptions during the computerized interview process. Also, this lender has ideas of its own that might further improve the profits, and so it too, engages in its own a "what if" process utilizing device 2 to change some of the predictive model parameters selected by the grower. In this manner, the lender as well as the grower, is able to satisfy itself that certain risks have been accounted for using the predictive modeling tool, and it happily advises the grower that it can make the loan.

EXAMPLE 5

Variable Rate Pesticidal Application

In this prophetic example, a grower desires to apply a pesticidal compound to his seed-based agricultural product in a manner that applies it where it is needed but does not apply it where it is not needed. Utilizing the device 2, the grower maintains an agricultural pedigree for the agricultural product grown on his farm. In this example, the device 2 includes the capability for the grower to define one or more of his own grid designation units, which user definable unit may be his entire farm or one or more sub portions, such as one or more fields, within his farm. By combining the agricultural pedigree of the device 2 with the user definable grid designation unit, the grower can use any combination of historical data, real time data, predictive modeling and combinations thereof to ascertain which section within the grid designation unit need the application of the pesticidal compound. While the methodology for obtaining this data is not limiting to the invention, it can include visual identifications, physical sampling and/or testing, aerial observations, satellite observations, sensors present on or around or otherwise in proximity to the field, and combinations thereof. The user defined grid designation unit can be user defined by latitude and longitude coordinates, by graphical user interface, by satellite or other mapping technology or combinations thereof, or any other technology that allows the user to select a user defined grid designation unit. Upon ascertaining which areas within the user defined grid are in need of the pesticidal compound, this information is made part of the agricultural pedigree of the device 2, and is communicated via wireless computer technology, cell phone technology or any similar technology to a device for variably and/or selectively applying the pesticidal compound within the grid designation unit. Such a device might be, for example, the modern technologically advanced tractor, which can then use that information in combination with its spraying equipment and global positioning technology to deliver the pesticidal compound in a variable fashion within the grid designation unit where it is needed, and to stop such application within the grid designation unit where it is not needed.

EXAMPLE 6

Variable Harvesting

In this prophetic example, a grower desires to harvest his seed-based agricultural product in a manner that allows him to harvest that portion of his agricultural product which is ready for harvesting, but to leave in the field that portion which must mature further before harvesting. Utilizing the device 2, the grower maintains an agricultural pedigree for the agricultural product grown on his farm. In this example, the device 2 includes the capability for the grower to define one or more of his own grid designation units, which user definable grid designation unit may be his entire farm or one or more sub portions, such as one or more fields, within his farm. By combining the agricultural pedigree of the device 2 with the user definable grid, designation unit, the grower can use any combination of historical data, real time data, predictive modeling and combinations thereof to ascertain which section within the grid designation unit contains agricultural product ready for harvesting. While the methodology for obtaining this data is not limiting to the invention, it can include visual identifications, physical sampling and/or testing, aerial observations, satellite observations, sensors present on or around or otherwise in proximity to the field, and combinations thereof. The user defined grid designation unit can be user defined by latitude and longitude coordinates, by graphical user interface, by satellite or other mapping technology or combinations thereof, or any other technology that allows the user to select a user defined grid designation unit. Upon ascertaining which areas within the user defined grid are ready for harvesting, this information is made part of the agricultural pedigree of the device 2, and is communicated via wireless computer technology, cell phone technology or any similar technology to a device for variably harvesting the agricultural product within the grid designation unit. Such a device might be, for example, the modern technologically advanced tractor, which can then use that information in combination with its harvesting equipment and global positioning technology to deliver harvest the agricultural product in a variable fashion within the grid designation unit and to avoid harvesting within the grid designation unit where the crop must further mature for optimum yield or other results.

While particular embodiments have been described, alternatives, modifications, variations, improvements, and substantial equivalents that are or may be presently unforeseen may arise to applicants or others skilled in the art. Accordingly, the appended claims as filed, and as they may be amended, are intended to embrace all such alternatives, modifications, variations, improvements, and substantial equivalents. Further, the recited order of processing elements or sequences, or the use of numbers, letters, or other designations therefore, is not intended to limit the claimed processes to any order except as may be specified in the claims. There are many alternatives to the present invention that are within the scope of the broad teachings of this invention. The full scope and content of the present invention is defined by the appended claims and equivalents thereto.

What is claimed is:

1. A method for providing real-time automatically updated information regarding an agricultural product, the method comprising:
   a) providing an open communication network accessible information storage device adapted to receive input of data relating to at least one of the agricultural product's production, harvesting, distribution, processing and consumption, from one or more sources;
   b) maintaining, at the information storage device, a set of data corresponding to an agricultural pedigree of the agricultural product;
   c) receiving, at the information storage device, one or more contemporaneous inputs from a first plurality of electronic devices over time throughout at least the production of the agricultural product, wherein the inputting includes automated contemporaneous uploading of inputs from farm equipment engaged in the production of the agricultural product;
   d) updating, at the information storage device, the agricultural pedigree of the agricultural product based on the one or more contemporaneous inputs;
   e) based on the updated agricultural pedigree, calculating, at the information storage device, in real-time, information regarding the agricultural product, wherein the information is calculated by applying at least one of a data-driven decision support system (DSS), a data-oriented DSS, or a model-driven DSS to the one more inputted contemporaneous inputs, wherein the calculated information is used to determine when one or more time-sensitive actions with respect to the agricultural product is required; and
   f) transmitting from the information storage device to an electronic device at least a portion of said data and information via the open communication network.

2. The method according to claim 1 wherein the automated contemporaneous uploading of inputs from farm equipment engaged in the production of the agricultural product includes at least one input from mobile metering device on board the farm equipment and the method further including the step of co-ordinatingly orchestrating at least one of the production, harvesting, distribution, processing and consumption of the agricultural product via the open communication network.

3. The method according to claim 1 wherein the automated contemporaneous uploading of inputs from farm equipment engaged in the production of the agricultural product includes at least one input from mobile metering device on board the farm equipment and the method further including the step of evaluating a sustainability measurement for the agricultural product according to predefined sustainability parameters, and assigning it a sustainability rating based upon a sustainability scale.

4. The method according to claim 1 wherein the automated contemporaneous uploading of inputs from farm equipment engaged in the production of the agricultural product includes at least one input from mobile metering device on board the farm equipment and the method further including the step of evaluating compliance of the agricultural product with preexisting standards in accordance with predefined standard requirements.

5. The method according to claim 1 wherein the automated contemporaneous uploading of inputs from farm equipment engaged in the production of the agricultural product includes at least one input from mobile metering device on board the farm equipment and the method further including the steps of accessing and predicting at least one measurement of the agricultural product including a sustainability measurement, a profitability measurement, a water usage measurement, a carbon footprint measurement, a risk management measurement and an energy measurement.

6. The method according to claim 1 wherein the step of inputting the data into the information storage device further includes collecting selected agricultural information of an agricultural pedigree system for the agricultural product through a computerized interview process and wherein the automated contemporaneous uploading of inputs from farm equipment engaged in the production of the agricultural product includes at least one input from mobile metering device on board the farm equipment.

7. The method according to claim 1 wherein the automated contemporaneous uploading of inputs from farm equipment engaged in the production of the agricultural product includes at least one input from mobile metering device on board the farm equipment and the method further including the step of allowing access to the information storage device to at least one of an agricultural product producer, harvester, packager, transporters, processor, distributor, and consumer, and communication between at least two of said agricultural product producer, harvester, packager, transporter, processor, distributor, and consumer.

8. A method for providing real-time automatically updated information regarding at least one agricultural product, the method comprising::
   a) providing an open communication network accessible information storage device adapted to receive input of data relating to at least one of the agricultural product's production, harvesting, distribution, processing and consumption, from one or more sources;
   b) maintaining, at the information storage device, a set of data corresponding to an agricultural pedigree of the at least one agricultural product;
   c) receiving, at the information storage device, one or more contemporaneous inputs from a first plurality of electronic devices over time throughout at least the production of the agricultural product, wherein the inputting includes automated contemporaneous uploading of inputs from farm equipment engaged in the production of the agricultural product;
   d) updating, at the information storage device, the agricultural pedigree of the at least one agricultural product based on the one or more contemporaneous inputs;
   e) based on the updated agricultural pedigree, calculating, at the information storage device, in real-time information regarding the agricultural product, wherein the information is calculated by applying at least one of a data-driven decision support system (DSS), a data-oriented DSS, or a model-driven DSS to the one more inputted contemporaneous inputs, wherein the calculated information is used to determine when one or more time-sensitive actions with respect to the agricultural product is required;
   f) predicting at least one sustainability measurement of the agricultural product utilizing said data and information; and
   g) transmitting, from the information storage device to an electronic device at least a portion of said data and information via the open communication network.

9. The method according to claim 8 wherein the automated contemporaneous uploading of inputs from farm equipment engaged in the production of the agricultural product includes at least one input from mobile metering device on board the farm equipment and the method further including the step of co-ordinatingly orchestrating at least one of the production, harvesting, distribution, processing and consumption of the agricultural product via the open communication network.

10. The method according to claim 8 wherein the automated contemporaneous uploading of inputs from farm equipment engaged in the production of the agricultural product includes at least one input from mobile metering device on board the farm equipment and the method further including the step of evaluating a sustainability measurement for the agricultural product according to predefined sustainability parameters, and assigning it a sustainability rating based upon a sustainability scale.

11. The method according to claim 8 wherein the automated contemporaneous uploading of inputs from farm equipment engaged in the production of the agricultural product includes at least one input from mobile metering device on board the farm equipment and the method further including the step of evaluating compliance of the agricultural product with preexisting standards in accordance with predefined standard requirements.

12. The method according to claim 8 wherein the automated contemporaneous uploading of inputs from farm equipment engaged in the production of the agricultural product includes at least one input from mobile metering device on board the farm equipment and the step of predicting at least one sustainability measurement of the agricultural product includes at least one of a carbon footprint measurement and an energy measurement.

13. The method according to claim 8 wherein the step of inputting the data into the information storage device further includes collecting selected agricultural information of an agricultural pedigree system for the agricultural product through a computerized interview process.

14. The method according to claim 8 further comprising the step of allowing access to the information storage device to at least one of an agricultural product producer, harvester, packager, transporters, processor, distributor, and consumer, and communication between at least two of said agricultural product producer, harvester, packager, transporter, processor, distributor, and consumer.

15. An agricultural pedigree system for at least one agricultural product comprising an open communication network accessible information storage device adapted to maintain a set of data corresponding to an agricultural pedigree of the at least one agricultural product receive from a first plurality of electronic devices input of data relating to at least one of the agricultural product's production, harvesting, distribution, processing and consumption from one or more sources and configured for one or more contemporaneous inputs into the information storage device from the first plurality of electronic devices over time throughout at least one of the production, harvesting, distribution, processing and consumption of the agricultural product, wherein the system is further configured to update the agricultural pedigree of the agricultural product based on the one or more contemporaneous inputs at the information storage device; calculate at the information storage device in real-time information regarding the agricultural product based on the updated agricultural pedigree, wherein the information is calculated by applying at least one of a data-driven decision support system (DSS), a data-oriented DSS, or a model-driven DSS to the one more inputted contemporaneous inputs, and wherein the calculated information is used to determine when one or more time-sensitive actions with respect to the agricultural product is required; and wherein the system is further configured to transmit from the information storage device to an electronic device at least a portion of said data and information via the open communication network.

16. The system according to claim 15 wherein the system is configured to coordinatingly orchestrate at least one of the production, harvesting, distribution, processing and consumption of the agricultural product via the open communication network.

17. The system according to claim 15 wherein the system is configured to evaluate a sustainability measurement for the agricultural product according to predefined sustainability parameters, and to assign it a sustainability rating based upon a sustainability scale.

18. The system according to claim 15 wherein the system is configured to evaluate compliance of the agricultural product with preexisting standards in accordance with predefined standard requirements.

19. The system according to claim 15 wherein the system is configured to access and predict at least one measurement of the agricultural product including a sustainability measurement, a profitability measurement, a water usage measurement, a carbon footprint measurement, a risk management measurement and an energy measurement.

20. The system according to claim 15 wherein the system is configured to access and predict at least one sustainability measurement of the agricultural product including at least one of a water usage measurement, a carbon footprint measurement, and an energy usage measurement.

* * * * *